(12) United States Patent
Chen et al.

(10) Patent No.: US 9,524,039 B2
(45) Date of Patent: Dec. 20, 2016

(54) METHOD OF IDENTIFYING A TO-BE-IDENTIFIED OBJECT AND AN ELECTRONIC DEVICE OF THE SAME

(71) Applicant: Lenovo (Beijing) Co., Ltd., Beijing (CN)

(72) Inventors: Yuanqing Chen, Beijing (CN); Guang Yang, Beijing (CN); Xin Li, Beijing (CN); Cheng Guo, Beijing (CN); Hao Wang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 389 days.

(21) Appl. No.: 13/786,913

(22) Filed: Mar. 6, 2013

(65) Prior Publication Data

US 2013/0234962 A1 Sep. 12, 2013

(30) Foreign Application Priority Data

Mar. 6, 2012 (CN) .......................... 2012 1 0057466
Mar. 14, 2012 (CN) .......................... 2012 1 0067600
(Continued)

(51) Int. Cl.
*G06F 3/041* (2006.01)
*G06F 3/03* (2006.01)
(Continued)

(52) U.S. Cl.
CPC ............ *G06F 3/041* (2013.01); *G06F 3/03* (2013.01); *G06F 3/0346* (2013.01); *G06F 3/043* (2013.01);
(Continued)

(58) Field of Classification Search
USPC ........................................................ 345/173
See application file for complete search history.

(56) References Cited

U.S. PATENT DOCUMENTS 7,706,918 B2 4/2010 Sato
8,228,170 B2 7/2012 Do
(Continued)

FOREIGN PATENT DOCUMENTS

CN 101002196 A 7/2007
CN 101296732 A 10/2008
(Continued)

OTHER PUBLICATIONS

Mattel (YouTube video "Hand-on with Mattel's Apptivity toys and games", dated Feb. 14, 2012, URL: https://www.youtube.com/watch?v=ggebxZXGoBo).*
(Continued)

*Primary Examiner* — Jason Olson
*Assistant Examiner* — Sosina Abebe
(74) *Attorney, Agent, or Firm* — Brinks Gilson & Lione; G. Peter Nichols

(57) ABSTRACT

A method of identifying a to-be-identified object is described. The to-be-identified object is independent of the electronic device and is placed within a predetermined distance from the electronic device. The method of identifying the to-be-identified object includes the electronic device acquiring status information of the to-be-identified object; the electronic device generating an operation instruction according to the status information of the to-be-identified object; and the electronic device operating according to the operation instruction. The identifying method and its electronic device are capable of enabling users to complete the executing of applications of the electronic device through operating the to-be-identified object, so as to improve experience and enjoyment of users.

18 Claims, 19 Drawing Sheets

(30) Foreign Application Priority Data

| Jun. 5, 2012 | (CN) | 2012 1 0184279 |
| Jul. 3, 2012 | (CN) | 2012 1 0229482 |
| Sep. 10, 2012 | (CN) | 2012 1 0333243 |

(51) Int. Cl.
- *G06F 3/042* (2006.01)
- *G06F 3/043* (2006.01)
- *G06F 3/044* (2006.01)
- *G06F 3/046* (2006.01)
- *G06F 3/0346* (2013.01)

(52) U.S. Cl.
 CPC ............ *G06F 3/044* (2013.01); *G06F 3/046* (2013.01); *G06F 3/0414* (2013.01); *G06F 3/0416* (2013.01); *G06F 3/0425* (2013.01); *G06F 2203/04106* (2013.01)

(56) References Cited

U.S. PATENT DOCUMENTS

| 2004/0239648 | A1* | 12/2004 | Abdallah et al. | 345/173 |
| 2005/0247787 | A1* | 11/2005 | Von Mueller et al. | 235/449 |
| 2007/0239315 | A1 | 10/2007 | Sato | |
| 2009/0179734 | A1 | 7/2009 | Do | |
| 2009/0287999 | A1* | 11/2009 | Ooi | G06F 3/03547 715/702 |
| 2011/0050587 | A1* | 3/2011 | Natanzon et al. | 345/173 |
| 2011/0165948 | A1 | 7/2011 | Sasaki et al. | |
| 2011/0227871 | A1* | 9/2011 | Cannon | A63F 13/02 345/174 |
| 2012/0050198 | A1 | 3/2012 | Cannon | |
| 2012/0068919 | A1* | 3/2012 | Lauder et al. | 345/156 |
| 2012/0212460 | A1* | 8/2012 | Hagg | 345/182 |
| 2013/0135246 | A1* | 5/2013 | Aubert et al. | 345/174 |

FOREIGN PATENT DOCUMENTS

| CN | 101482879 | | 7/2009 |
| CN | 101576770 | | 11/2009 |
| CN | 101890720 | | 11/2010 |
| CN | 102143784 | A | 8/2011 |
| CN | 202025377 | U | 11/2011 |
| CN | 102344042 | | 2/2012 |

OTHER PUBLICATIONS

First Office Action dated Sep. 25, 2014 in corresponding application No. 201210184279.4 filed on Jun. 5, 2012 (15 pages including English translation).

First Office Action dated Oct. 10, 2014 from corresponding Chinese Application No. CN 201210229482.9 (15 pages including English translation).

First Office Action dated Oct. 21, 2015 from corresponding Chinese priority Application No. 201210067600.0 (16 pages).

Second Office Action dated Jun. 5, 2015 from corresponding Chinese priority Application No. 201210229482.9 (10 pages).

Second Office Action dated Apr. 13, 2016 out of Chinese priority Application No. 201210067600.0 (15 pages including English translation).

\* cited by examiner

METHOD OF IDENTIFYING A TO-BE-IDENTIFIED OBJECT AND AN ELECTRONIC DEVICE OF THE SAME

This application claims priority to Chinese patent application No. CN 201210057466.6 filed on Mar. 6, 2012; CN 201210229482.9 filed on Jul. 3, 2012; CN 201210333243.8 filed on Sep. 10, 2012; CN 201210184279.4 filed on Jun. 5, 2012; and CN 201210067600.0 filed on Mar. 14, 2012, the entire contents of each are incorporated herein by reference.

BACKGROUND

The present disclosure relates to a technical field of object identifying, in particular to a method of identifying a to-be-identified object and an electronic device of the same.

At present, electronic devices such as Tablet Personal Computer (TPC), touch screen mobile phone and so on have been widely accepted. Users are able to conveniently operate software in the electronic devices such as TPC, touch screen mobile phone and so on to work or play games.

For example, at present, there is an application game in TPC, which needs to dice to determine the next game action of users. The application game software provides a dice icon on the display screen of the TPC, through which users will click the dice icon to inform the TPC that the users request for dicing. The TPC executes an executing program for the dice, such that the dice displays a random number of points, so as to make the TPC to move on to the next game action according to the random number of points.

In the process of implementing embodiments of the present disclosure, it is found that at least the following problems exist in the prior art:

In the processes of playing games through clicking the icon provided on the display screen and so on, users cannot feel operations on an entity of the icon, thus making experience and enjoyment of users worse.

SUMMARY

The embodiments of the present disclosure provide a method of identifying a to-be-identified object and an electronic device of the same being capable of improving experience and enjoyment of users.

According to one aspect of the present disclosure, provided is a method of identifying a to-be-identified object applied to an electronic device. The to-be-identified object is independent of the electronic device and is placed within a predetermined distance from the electronic device. The method comprises: the electronic device acquiring status information of the to-be-identified object; the electronics device generating an operation instruction according to the status information of the to-be-identified object; and the electronic device operating according to the operation instruction.

In one example, the electronic device comprises a display screen, and the to-be-identified object is placed within a coverage area of the display screen of the electronic device or is placed within a space composed of extended distances extending from each of sides of the electronic device.

In one example, the operation instruction is an instruction for controlling the electronic device to perform a corresponding action, and the corresponding action is changing output content or calling a program.

In one example, the electronic device acquiring status information of the to-be-identified object comprises: the electronic device acquiring the status information of the to-be-identified object through identifying the to-be-identified object; or the electronic device receiving the status information sent from the to-be-identified object, the status information being status information determined by the to-be-identified object itself.

In one example, the display screen comprises an electric field layer for forming an electric field, and the electric field changes when the to-be-identified object is placed in the electric field; wherein at least one conductor is set in the to-be-identified object; and the electronic device identifies the to-be-identified object through the following operations: detecting a conductor distribution in the to-be-identified according to changing information of the electric field and determining encoding information of the to-be-identified object according to the conductor distribution; and identifying the to-be-identified object according to the encoding information of the to-be-identified object and prestored encoding information in the electronic device.

In one example, the method of identifying the to-be-identified object further comprises: analyzing a posture of the to-be-identified object according to change of the encoding information of the to-be-identified object.

In one example, the conductor distribution of the at least one conductor in the to-be-identified object is a two-dimensional distribution or a three-dimensional distribution.

In one example, the display screen is a touch display screen. When the to-be-identified object is placed within a coverage area of the touch display screen of the electronic device, the electronic device acquiring status information of the to-be-identified object comprises: detecting and identifying a contact signal of the to-be-identified object on the touch display screen; and generating a magnetic encoding sequence for an occurring position of the contact signal in response to the contact signal.

In one example, the electronic device generating an operation instruction according to the status information of the to-be-identified object comprises: determining attribute of the contact signal; calling operation codes corresponding to an executing operation by referring to a mapping table of the relationship between the attribute of the contact signal and the executing operation; and executing the operation codes.

In one example, the method of identifying the to-be-identified object further comprises: determining a path of a hand signal when the contact signal is the hand signal; generating a magnetic encoding sequence for an occurring position of the contact signal comprises: generating the magnetic encoding sequence for an ending position of the path of the hand signal.

In one example, the electronic device comprises a first identifying means and a second identifying means, the first identifying means being used for determining a first identifying information of the to-be-identified object and the second identifying means being used for determining a second identifying information of the to-be-identified object. The electronic device identifies the to-be-identified object through the following operations: determining the first identifying information of the to-be-identified object through the first identifying means; determining an identifying range of the to-be-identified object according to the first identifying information; determining the second identifying information of the to-be-identified object through the second identifying means; and determining the to-be-identified object within the identifying range of the to-be-identified object according to the second identifying information.

According to another aspect of the present disclosure, provided is an electronic device, comprising: an acquiring unit for acquiring status information of a to-be-identified object being independent of the electronic device and placed within a predetermined distance from the electronic device; a generating unit for generating an operation instruction according to the status information of the to-be-identified object; and an operating unit for operating according to the operation instruction.

In one example, the electronic device further comprises: a display screen, and the to-be-identified object is placed within a coverage area of the display screen of the electronic device or is placed within a space composed of extended distances extending from each of sides of the electronic device.

In one example, the operation instruction is an instruction for controlling the electronic device to perform a corresponding action, and the corresponding action is changing output content or calling a program.

In one example, the acquiring unit of the electronic device comprises: an identifying sub-unit for identifying the to-be-identified object to acquire the status information of the to-be-identified object; and a receiving sub-unit for receiving the status information sent from the to-be-identified object, the status information being status information determined by the to-be-identified object itself.

In one example, the display screen of the electronic device comprises: an electric field layer for forming an electric field, and the electric field changes when the to-be-identified object is placed in the electric field; wherein at least one conductor is set in the to-be-identified object; and the identifying sub-unit further comprises: a detecting unit for detecting a conductor distribution in the to-be-identified object according to changing information of the electric field and determining encoding information of the to-be-identified object according to the conductor distribution; and a processing unit for identifying the to-be-identified object according to the encoding information of the to-be-identified object and prestored encoding information in the electronic device.

In one example, the processing unit further analyzes a posture of the to-be-identified object according to change of the encoding information of the to-be-identified object.

In one example, the conductor distribution of the at least one conductor in the to-be-identified object is a two-dimensional distribution or a three-dimensional distribution.

In one example, the display screen of the electronic device is a touch display screen. When the to-be-identified object is placed within a coverage area of the touch display screen of the electronic device, the acquiring unit comprises: a signal detection module for detecting and identifying a contact signal of the to-be-identified object on the display screen; a trigger module for triggering start-up of a magnetic encoding module installed in the electronic device in response to the contact signal; and the magnetic encoding module for generating a magnetic encoding sequence for an occurring position of the contact signal.

In one example, the electronic decide further comprises: a storage for storing a mapping table indicating a relationship between attribute of the contact signal and an executing operation as well as associated operation codes corresponding to the executing operation; wherein the operating unit determines attribute of the contact signal, calls operation codes corresponding to the executing operation by referring to the mapping table, and then executes the operation codes.

In one example, the operating unit further determines a path of a hand signal when the contact signal is the hand signal; and the magnetic encoding module generates a magnetic encoding sequence for an ending position of the path of the hand signal.

In one example, the electronic device comprises a first identifying means and a second identifying means. The first identifying means is used for determining a first identifying information of the to-be-identified object; and the second identifying means is used for determining a second identifying information of the to-be-identified object, wherein the identifying sub-unit determines an identifying range of the to-be-identified object according to the first identifying information and determines the to-be-identified object within the identifying range of the to-be-identified object according to the second identifying information.

The embodiments of the present disclosure provide a method of identifying a to-be-identified object and an electronic device of the same. The electronic device acquires status information of the to-be-identified object placed within a predetermined distance from the electronic device and generates an operation instruction according to the status information, such that the electronic device performs corresponding operations. Compared with the prior art, the identifying method and its electronic device provided in the embodiments of the present disclosure are capable of enabling users to complete the running of applications of the electronic device through operating the to-be-identified object, so as to improve experience and enjoyment of users.

BRIEF DESCRIPTION OF THE DRAWINGS

In order to more explicitly specify the technical solutions in the embodiments of the present disclosure or in the prior art, below will be a brief introduction of accompanying drawings needed to be used in descriptions of the embodiments or in the prior art. Obviously, the drawings in the below descriptions are merely some embodiments of the present disclosure. For those ordinarily skilled in the art, they may obtain other drawings in the light of these drawings, without paying any inventive labor.

DETAILED DESCRIPTION

The technical solutions in the embodiments of the present disclosure will be clearly and completely described in detail in combination with the accompanying figures in the embodiments of the present disclosure. Obviously, the embodiments described are merely part of embodiments of the present disclosure rather than all the embodiments. Based on the embodiments of the present disclosure, all the other embodiments obtained by those skilled in the art without paying any inventive labor fall into the scope sought for protection in the present disclosure.

In order to make advantages of the technical solutions of the present disclosure more clear, below will be a detailed description of the present disclosure in combination with the accompanying drawings and the embodiments.

First Embodiment

Figure 1:
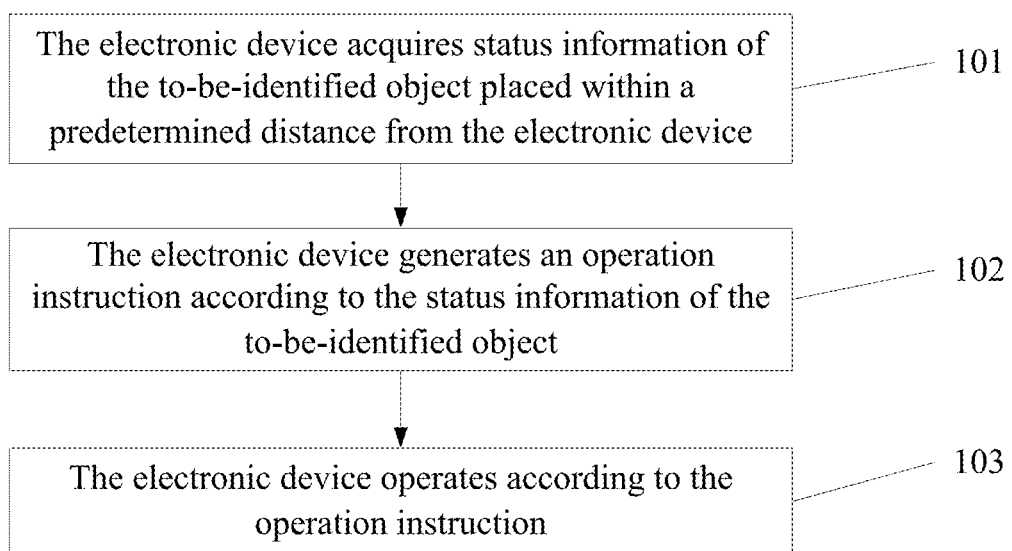
FIG. 1 is a flow chart of a method of identifying a to-be-identified object provided in a first embodiment of the present disclosure.

As shown in FIG. 1, a method of identifying a to-be-identified object provided in the present embodiment of the present disclosure is applied to an electronic device. The to-be-identified object is independent of the electronic device and placed within a predetermined distance from the electronic device. The method comprises:

Step 101, the electronic device acquires status information of the to-be-identified object.

Wherein the electronic device can comprise a display screen, and the to-be-identified object can be placed within a coverage area of the display screen of the electronic device or is placed within a space composed of extended distances extending from each of sides of the electronic device, but not limited thereto.

In particular, the electronic device can acquire the status information of the to-be-identified object through identifying the to-be-identified object; or the electronic device can directly receive the status information sent from the to-be-identified object, wherein the status information is status information determined by the to-be-identified object itself, but not limited thereto.

The status information of the to-be-identified object can be acquired when the electronic device acquires that the status of the to-be-identified object satisfies a predetermined condition.

In one example, the predetermined condition may be that the to-be-identified object is in a static status, and then the status information of the to-be-identified object may be acquired when the electronic device acquires that the to-be-identified object is in a static status.

Alternatively, in another example, the predetermined condition may be that the electronic device detects the status of the to-be-identified object for many times and detects that the status of the to-be-identified object will not change after a predetermined number of times or a predetermined time is exceeded, and then the status information of the to-be-identified object is acquired when the electronic device detects that the status of the to-be-identified object does not change after the predetermined number of times or the predetermined time is exceeded.

For example, the to-be-identified object may be a dice for use in games. When the dice is thrown on the display screen of the electronic device, the electronic device can acquire the status information of the dice when the dice is in a static status, or the electronic device is provided with a detection device (for example an integrated camera) thereon to real-time detect the status of the dice. After the predetermined number of times or the predetermined time is exceeded, the status information of the dice is acquired if the status of the dice does not change, for example, acquiring the number of points of a side opposite to a contact side according to the number of points of the contact side of the dice on the electronic device (for a general cube dice, the side opposite to the contact side is upward, and the number of points of the side opposite to the contact side is commonly the number of points to be acquired by users), but not limited thereto.

Step 102, the electronic device generates an operation instruction according to the status information of the to-be-identified object.

Wherein the operation instruction is an instruction for controlling the electronic device to perform a corresponding action, and the corresponding action is changing output content or calling a program.

For example, there is a checkers game in the electronic device. The electronic device generates an instruction that instructs a chess piece in the checkers game in the electronic device to move 3 steps according to the acquired number of points (for example, the number of points is 3) of the side opposite to the contact side, but not limited thereto.

Step 103, the electronic device operates according to the operation instruction.

In particular, the electronic device enables to run applications in the electronic device according to the operation instruction.

For example, the electronic device operates the chess piece in the checkers game to move forward 3 steps according to the instruction of moving forward 3 steps, but not limited thereto.

It is worth noting that, the electronic device may be a TPC, a touch screen mobile phone and so on, and the to-be-identified object may be a dice for use in games, a mouse, a chess piece and so on, but not limited thereto.

In the identifying method of the present embodiment of the present disclosure, the electronic device acquires the status information of the to-be-identified object placed within the predetermined distance from the electronic device and generates the operation instruction according to the status information, such that the electronic device performs a corresponding operation. Compared with the prior art, the identifying method provided in the present embodiment of the present disclosure is capable of enabling users to complete the running of applications of the electronic device through operating the to-be-identified object, so as to improve experience and enjoyment of uses.

In order to make those skilled in the art to better understand the technical solution provided in the present embodiment of the present disclosure, below will be a further introduction of the identifying method provided in the present embodiment of the present disclosure by another particular example.

Figure 2:
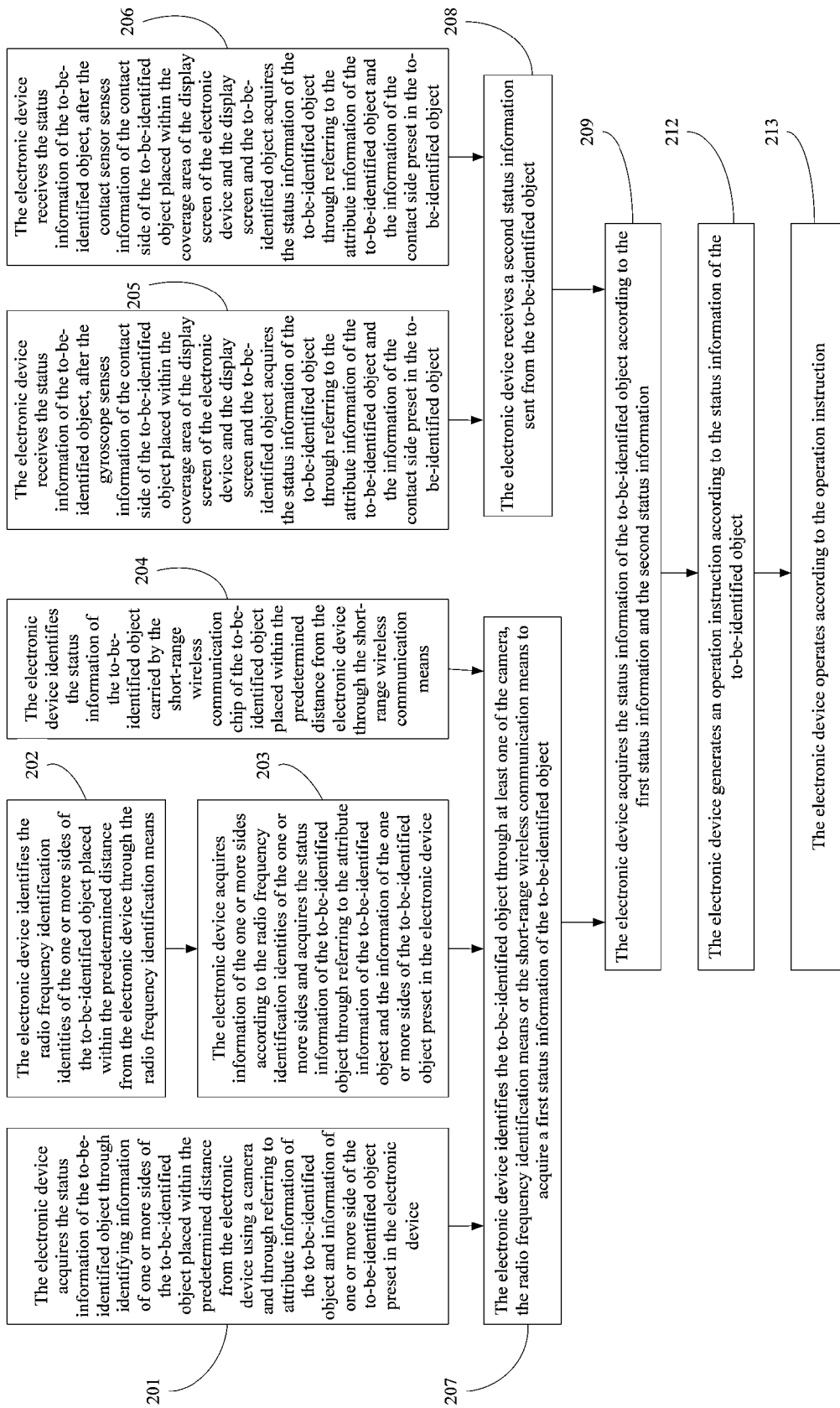
FIG. 2 is a flow chart 1 of a method of identifying a to-be-identified object provided in the first embodiment of the present disclosure.
Figure 3:
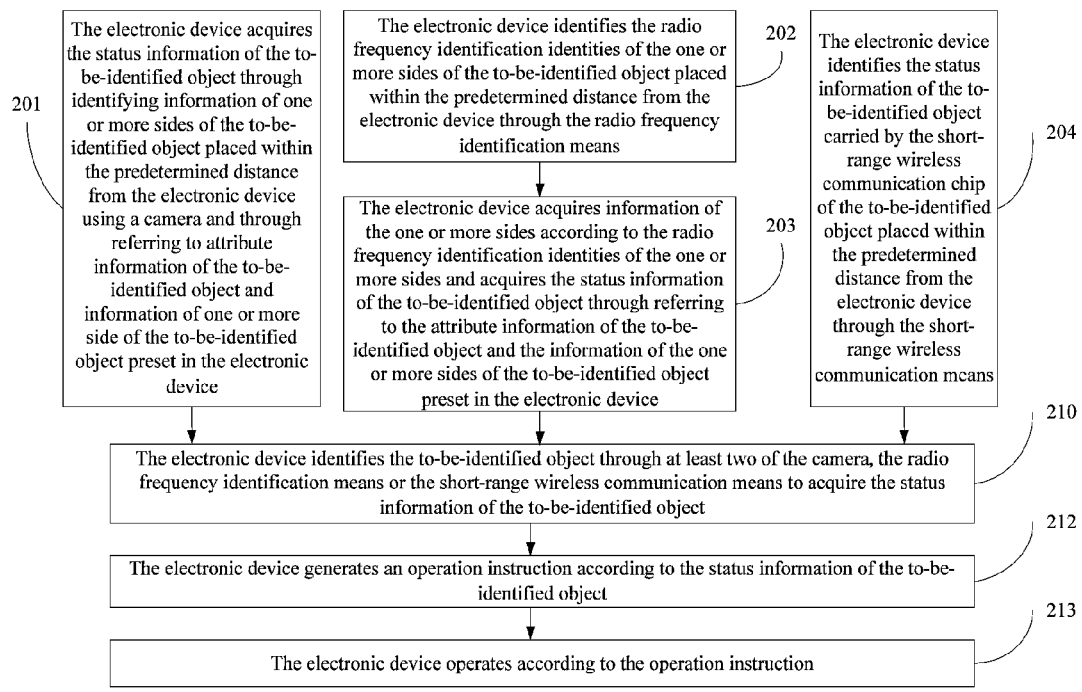
FIG. 3 is a flow chart 2 of a method of identifying a to-be-identified object provided in the first embodiment of the present disclosure.
Figure 4:
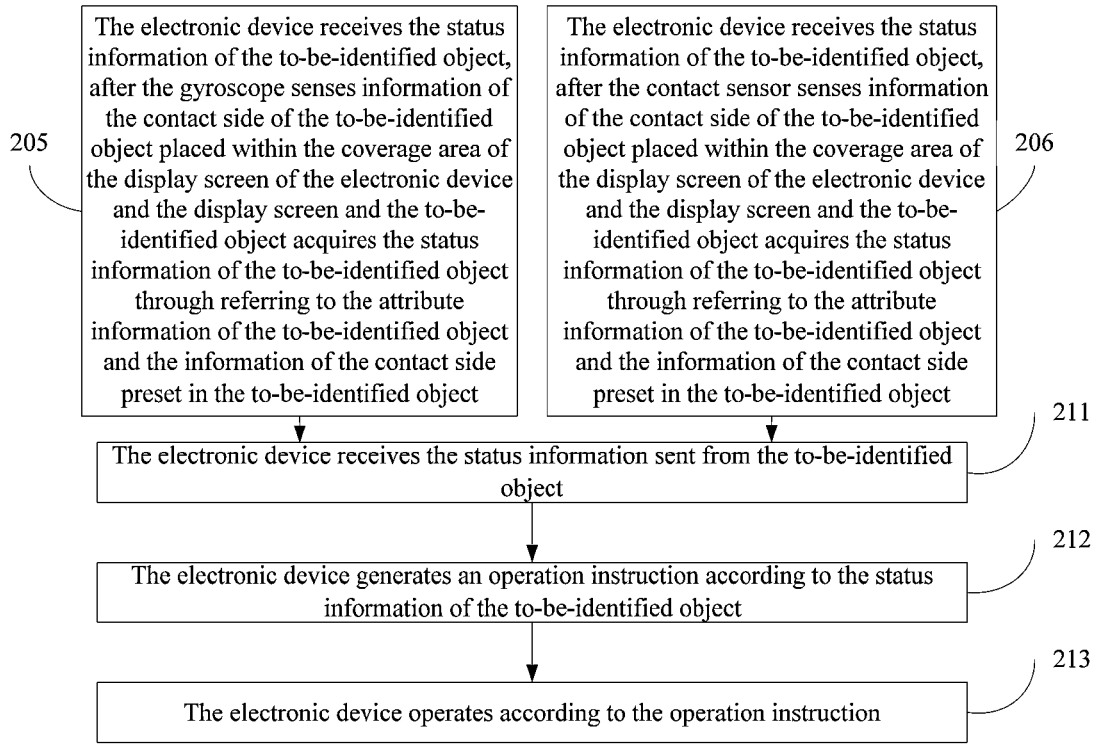
FIG. 4 is a flow chart 3 of a method of identifying a to-be-identified object provided in the first embodiment of the present disclosure.

As shown in FIGS. 2, 3 and 4, illustrated are other examples of the method of identifying the to-be-identified object provided in the present embodiment of the present disclosure. The method comprises:

If the electronic device is set with a camera, the following steps are performed:

Step 201, the electronic device acquires the status information through identifying information of one or more sides of the to-be-identified object placed within the predetermined distance from the electronic device using a camera and through referring to attribute information of the to-be-identified object and information of one or more sides of the to-be-identified object preset in the electronic device. Then, step 207 is performed as shown in FIG. 2, or step 210 is performed as shown in FIG. 3.

Wherein the information of the one or more sides may be information on shape of the one or more sides or information on pattern and text on the one or more sides and so on, and the attribute information of the to-be-identified object may be a corresponding relationship between the information of the one or more sides and the status information of the to-be-identified object preset in the electronic device, but not limited thereto.

Taking the dice for use in games in the present embodiment described above as an example, when the dice is thrown on the display screen of the electronic device and keeps static for a period (for example, one second), the camera will shoot and acquire the number of points of the contact side of the dice on the electronic device, but not limited thereto.

If the electronic device is set with a radio frequency identification means and each of sides of the to-be-identified object is set with a radio frequency identification identities, the following steps are performed:

Step 202, the electronic device identifies the radio frequency identification identities of the one or more sides of the to-be-identified object placed within the predetermined distance from the electronic device through the radio frequency identification means. Then, step 203 is performed.

Wherein the radio frequency identification identities are also called as electronic tags, which can identify a specific target and read-write relevant data over a radio signal.

Taking the dice for use in games as an example, the six sides of the dice are respectively set with respective radio frequency identification identities. When the dice is thrown on the display screen of the electronic device and keeps static for a period (for example, one second), the electronic device identifies the radio frequency identification identities of the contact side contacting with the display screen through the radio frequency identification.

Step 203, the electronic device acquires information of the one or more sides according to the radio frequency identification identities of the one or more sides and acquires the status information of the to-be-identified object through referring to the attribute information of the to-be-identified object and the information of the one or more sides of the to-be-identified object preset in the electronic device. Then, step 207 is performed as shown in FIG. 2, or step 210 is performed as shown in FIG. 3.

Wherein the attribute information of the to-be-identified object may be the corresponding relationship between the radio frequency identification identities and the information of the one or more sides and the corresponding relationship between the information of the one or more sides and the status information.

Taking the dice for use in games as an example, the electronic device finds the number of points corresponding to the radio frequency identification identities according to the radio frequency identification identities of the contact side contacting with the display screen (for example, a table of the corresponding relationship between the radio frequency identification identities and the number of points may be set in the electronic device, but not limited thereto).

If a short-range wireless communication means is set on the electronic device and a short-range wireless communication chip is set in the to-be-identified object, the following steps are performed:

Step 204, the electronic device identifies the status information of the to-be-identified object carried by the short-range wireless communication chip in the to-be-identified object placed within the predetermined distance from the electronic device through the short-range wireless communication means. Then, step 207 is performed as shown in FIG. 2, or step 210 is performed as shown in FIG. 3.

Wherein the status information of the to-be-identified object may be stored in the short-range wireless communication chip in the to-be-identified object.

If the to-be-identified object is set with a gyroscope, the following steps are performed:

Step 205, the electronic device receives the status information of the to-be-identified object, after the gyroscope senses information of the contact side of the to-be-identified object placed within the coverage area of the display screen of the electronic device and the display screen, and the to-be-identified object acquires the status information of the to-be-identified object through referring to the attribute information of the to-be-identified object and the information of the contact side preset in the to-be-identified object. Then, step 208 is performed as shown in FIG. 2, or step 211 is performed as shown in FIG. 4.

Wherein the attribute information of the to-be-identified object may be preset in the to-be-identified object or may be a corresponding relationship between the information of the contact side and the status information, but not limited thereto.

For example, when the to-be-identified object is thrown on the display screen of the electronic device, the gyroscope in the to-be-identified object can determine the current status of the to-be-identified object according to the gravity sensed by the gyroscope itself and directly send the status information related to the current status to the electronic device, but not limited thereto.

If the to-be-identified object is set with a contact sensor, the following steps are performed:

Step 206, the electronic device receives the status information of the to-be-identified object, after the contact sensor senses information of the contact side of the to-be-identified object placed within the coverage area of the display screen of the electronic device and the display screen, and the to-be-identified object acquires the status information of the to-be-identified object through referring to the attribute information of the to-be-identified object and the information of the contact side preset in the to-be-identified object. Then, step 208 is performed as shown in FIG. 2, or step 211 is performed as shown in FIG. 4.

Wherein the attribute information of the to-be-identified object may be preset in the to-be-identified object and may be a corresponding relationship between the information of the contact side and the status information, but not limited thereto.

For example, when the to-be-identified object is thrown on the display screen of the electronic device, the contact sensor in the to-be-identified object can determine the current status of the to-be-identified object according to the information of the contact side sensed by the contact sensor itself and directly send the status information related to the current status to the electronic device, but not limited thereto.

Taking a dice for use in games as an example, when the dice is thrown on the display screen of the electronic device and keeps static for a period, the contact sensor senses the side contacting with the display screen, so as to determine the number of points of the contact side of the dice, thus further acquiring the number of points of the side opposite to the contact side, but not limited thereto.

The electronic device is set with at least one sensing unit and the to-be-identified object is set with at least one sensing unit. The sensing unit of the electronic device may comprise: a camera, a radio frequency identification means or a short-range wireless communication means, but not limited thereto; and the sensing unit of the to-be-identified object may comprise: a gyroscope or a contact sensor, but not limited thereto, then the following steps are performed:

Step 207, the electronic device identifies the to-be-identified object through at least one of the camera, the radio frequency identification means or the short-range wireless communication means to acquire a first status information of the to-be-identified object.

In particular, the first status information is a status information integrated from the information of the to-be-identified object acquired by the electronic device through the camera, the radio frequency identification means and the short-range wireless communication mean and so on.

Step 208, the electronic device receives a second status information sent from the to-be-identified object.

Wherein the second status information is information of the to-be-identified object identified by the to-be-identified object through at least one of the gyroscope or the contact sensor.

Step 209, the electronic device acquires the status information of the to-be-identified object according to the first status information and the second status information. Then, step 212 is continuously performed.

In particular, the status information of the to-be-identified object is enabled to be more complete and reliable through integrating the first status information and the second status information into the status information of the to-be-identified object.

The electronic device is set with at least two sensing units, and the sensing units of the electronic device comprise: the camera, the radio frequency identification means or the short-range wireless communication means, and then the following steps are performed:

Step 210, the electronic device identifies the to-be-identified object through at least two of the camera, the radio frequency identification means or the short-range wireless communication means to acquire the status information of the to-be-identified object. Then, step 212 is continuously performed.

The to-be-identified object is set with at least two sensing units, and the sensing units of the to-be-identified object comprise: the gyroscope or the contact sensor, and then the following steps are performed:

Step 211, the electronic device receives the status information of the to-be-identified object sent from the to-be-identified object. Then, step 212 is continuously performed.

Wherein the status information of the to-be-identified object is information of the to-be-identified object identified by the to-be-identified object through at least two of the gyroscope or the contact sensor.

Step 212, the electronic device generates an operation instruction according to the status information of the to-be-identified object.

Wherein the operation instruction is an instruction for controlling the electronic device to perform a corresponding action, and the corresponding action is changing output content or calling a program.

For example, there is a checkers game in the electronic device. It needs to use the above-described dice in the checkers game. The electronic device generates an instruction that instructs a chess piece in the checkers game in the electronic device to move forward 3 steps according to the acquired number of points (for example, the number of points is 3) of the side opposite to the contact side of the dice on the display screen, but not limited thereto.

Step 213, the electronic device operates according to the operation instruction.

In particular, the electronic device enables to run applications in the electronic device according to the operation instruction.

For example, the electronic device operates the chess piece in the checkers game to move forward 3 steps according to the instruction that instructs a chess piece in the checkers game in the electronic device to move forward 3 steps, but not limited thereto.

In the examples of a method of identifying the to-be-identified object provided in the present embodiment of the present disclosure, the electronic device acquires the information of one or more sides of the to-be-identified object placed within the predetermined distance from the electronic device, acquires the status information of the to-be-identified object through referring to the attribute information of the to-be-identified object and the information of the one or more sides of the to-be-identified object preset in the electronic device, and generates the operation instruction according to the status information of the to-be-identified object, such that the electronic device can perform a corresponding operation. Compared with the prior art, the identifying method provided in the present embodiment of the present disclosure is capable of improving experience and enjoyment of users.

Figure 5:
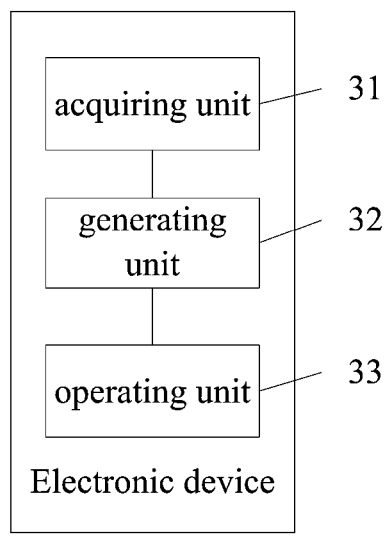
FIG. 5 is an illustrative diagram 1 of structure of an electronic device provided in the first embodiment of the present disclosure.

As shown in FIG. 5, an electronic device provided in the present embodiment comprises:

An acquiring unit 31 for acquiring status information of the to-be-identified object being independent of the electronic device and placed within a predetermined distance from the electronic device (Please refer to step 101 in FIG. 1 for its detailed implementation mode, details omitted);

A generating unit 32 for generating an operation instruction according to the status information of the to-be-identified object (Please refer to step 102 in FIG. 1 for its detailed implementation mode, details omitted); and An operating unit 33 for operating according to the operating instruction (Please refer to step 103 in FIG. 1 for its detailed implementation mode, details omitted).

Figure 6:
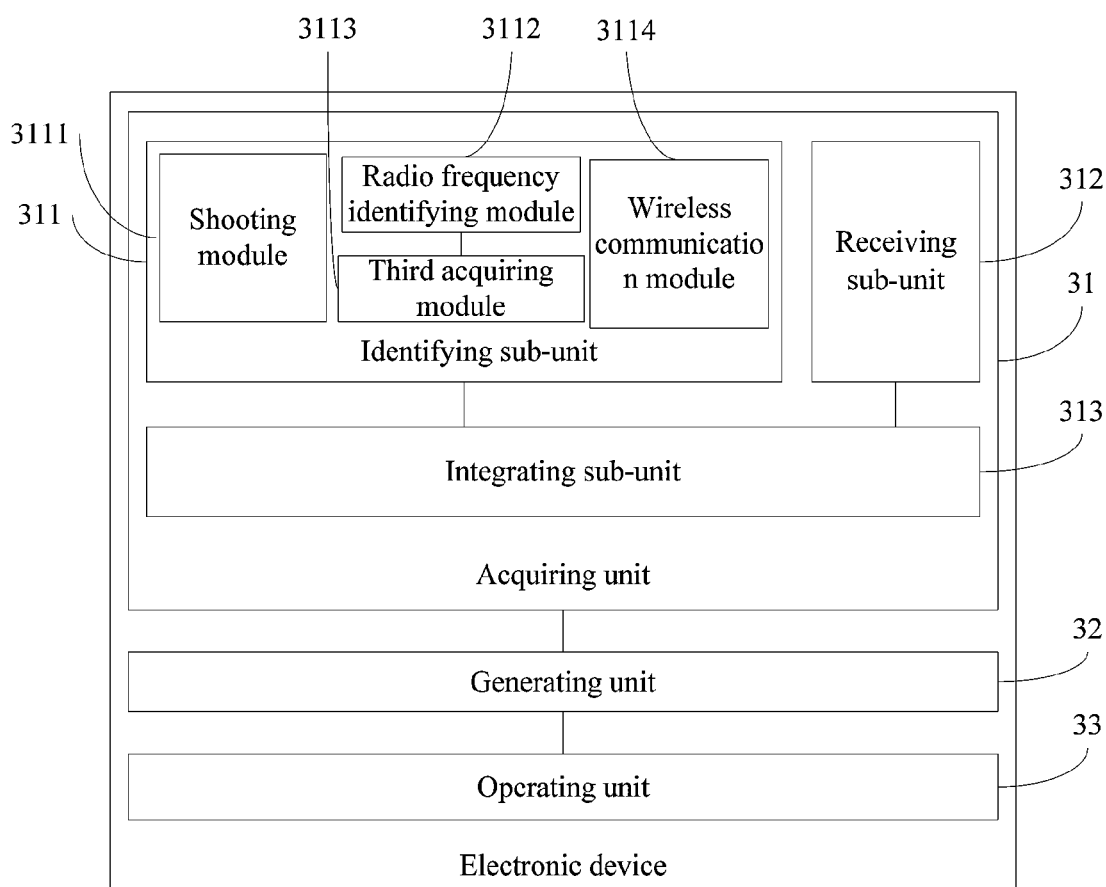
FIG. 6 is an illustrative diagram 2 of structure of an electronic device provided in the first embodiment of the present disclosure.

Further, as shown in FIG. 6, the electronic device comprises a display screen, and the to-be-identified object is placed within a coverage area of the display screen of the electronic device or is placed within a space composed of extended distances extending from each of sides of the electronic device.

Further, as shown in FIG. 6, the operation instruction is an instruction for controlling the electronic device to perform a corresponding action, and the corresponding action is changing output content or calling a program.

Further, as shown in FIG. 6, the acquiring unit 31 comprises:

An identifying sub-unit 311 for identifying the to-be-identified object to acquire the status information of the to-be-identified object (Please refer to step 101 in FIG. 1 for its detailed implementation mode, details omitted).

In particular, the identifying sub-unit 311 can be particularly used for acquiring the status information of the to-be-identified object when the electronic device acquires that the status of the to-be-identified object satisfies a predetermined condition.

In particular, the predetermined condition is that the to-be-identified object is in a static state, and then the identifying sub-unit 311 comprises a first acquiring module for acquiring the status information of the to-be-identified object when the electronic device acquires that the to-be-identified object is in a static status. Or, the predetermined condition is that the electronic device detects the status of the to-be-identified object for many times and detects that the status of the to-be-identified object will not change after a predetermined number of times or a predetermined time is exceeded, and then the identifying sub-unit 311 comprises a second acquiring module for acquiring the status information of the to-be-identified object when the electronic device detects that the status of the to-be-identified object does not change after the predetermined number of times or the predetermined time is exceeded.

The acquiring unit 31 further comprises: a receiving sub-unit 312 for receiving the status information sent from the to-be-identified object, and the status information is status information determined by the to-be-identified object itself. Please refer to step 101 in FIG. 1 for its detailed implementation mode, details omitted.

Further, as shown in FIG. 6, a camera is set on the electronic device. The identifying sub-unit 311 comprises:

A shooting module 3111 for acquiring the status information of the to-be-identified object through identifying information of the one or more sides of the to-be-identified object placed within the predetermined distance from the electronic device using the camera and through referring to the attribute information of the to-be-identified object and the information of the one or more sides of the to-be-identified object preset in the electronic device. Please refer to step 201 in FIG. 2 for its detailed implementation mode, details omitted.

Further, as shown in FIG. 6, a radio frequency identification means is set on the electronic device and each of sides of the to-be-identified object is set with radio frequency identification identities. The identifying sub-unit 311 comprises:

A radio frequency identifying module 3112 for identifying the radio frequency identification identities of the one or more sides of the to-be-identified object placed within the predetermined distance from the electronic device through the radio frequency identification means. Please refer to step 202 in FIG. 2 for its detailed implementation mode, details omitted.

A third acquiring module 3113 for acquiring the information of the one or more sides according to the radio frequency identification identities of the one or more sides and acquiring the status information of the to-be-identified object through referring to the attribute information of the to-be-identified object and the information of the one or more sides preset in the electronic device. Please refer to step 203 in FIG. 2 for its detailed implementation mode, details omitted.

Further, as shown in FIG. 6, a short-range wireless communication means is set on the electronic device and a short-range wireless communication chip is set in the to-be-identified object. The identifying sub-unit 311 comprises:

A wireless communication module 3114 for identifying the status information of the to-be-identified object carried by the short-range wireless communication chip in the to-be-identified object placed within the predetermined distance from the electronic device through the short-range wireless communication means. Please refer to step 204 in FIG. 2 for its detailed implementation mode, details omitted.

Further, as shown in FIG. 6, the to-be-identified object is set with a gyroscope. The receiving sub-unit 312 is in particular used for:

Receiving the status information of the to-be-identified object after the gyroscope senses information of the contact side of the to-be-identified object placed within the coverage area of the display screen of the electronic device and the display screen and the to-be-identified object acquires the status information of the to-be-identified object through referring to the attribute information of the to-be-identified object and the information of the contact side preset in the to-be-identified object. Please refer to step 205 in FIG. 2 for its detailed implementation mode, details omitted.

Further, as shown in FIG. 6, the to-be-identified object is set with a contact sensor. The receiving sub-unit 312 is in particular used for:

Receiving the status information of the to-be-identified object, after the contact sensor senses information of the contact side of the to-be-identified object placed within the coverage area of the display screen of the electronic device and the display screen and the to-be-identified object acquires the status information of the to-be-identified object through referring to the attribute information of the to-be-identified object and the information of the contact side preset in the to-be-identified object. Please refer to step 206 in FIG. 2 for its detailed implementation mode, details omitted.

Further, as shown in FIG. 6, the electronic device is set with at least one sensing unit and the to-be-identified object is set with at least one sensing unit. The sensing unit of the electronic device may comprise: a camera, a radio frequency identification means or a short-range wireless communication means; and the sensing units of the to-be-identified object may comprise: a gyroscope or a contact sensor. Then, the identifying sub-unit 311 is in particular used for:

Identifying the to-be-identified object through at least one of the camera, the radio frequency identification means or the short-range wireless communication means to acquire a first status information of the to-be-identified object. Please refer to step 207 in FIG. 2 for its detailed implementation mode, details omitted.

The receiving sub-unit 312 is in particular used for:

Receiving a second status information sent from the to-be-identified object, and the second status information is information of the to-be-identified object identified by the to-be-identified object through at least one of the gyroscope or the contact sensor. Please refer to step 208 in FIG. 2 for its detailed implementation mode, details omitted.

The acquiring unit 31 further comprises:

An integrating sub-unit 313 for acquiring the status information of the to-be-identified object according to the first status information and the second status information. Please refer to step 209 in FIG. 2 for its detailed implementation mode, details omitted.

Further, as shown in FIG. 6, the electronic device is set with at least two sensing units, and the sensing units of the electronic device comprise: the camera, the radio frequency identification means or the short-range wireless communication means. Then, the identifying sub-unit 311 is in particular used for:

Identifying the to-be-identified object through at least two of the camera, the radio frequency identification means or the short-range wireless communication means to acquire the status information of the to-be-identified object. Please refer to step 210 in FIG. 3 for its detailed implementation mode, details omitted.

Further, as shown in FIG. 6, the electronic device is set with at least two sensing units, and the sensing units of the to-be-identified object comprise: the gyroscope or the contact sensor. Then, the receiving sub-unit 312 is in particular used for:

Receiving the status information of the to-be-identified object sent from the to-be-identified object, and the status information of the to-be-identified object is information of the to-be-identified object identified by the to-be-identified object through at least two of the gyroscope or the contact sensor. Please refer to step 211 in FIG. 4 for its detailed implementation mode, details omitted.

It is worth noting that, the to-be-identified object in the present embodiment of the present disclosure can be set with one or more of the radio frequency identification identities, the short-range wireless communication chip, the gyroscope and the contact sensor.

Second Embodiment

As described above, the electronic device is set with at least two sensing units, and the sensing units of the electronic device comprise: the camera, the radio frequency identification means or the short-range wireless communication means. In addition, the sensing unit of the electronic unit can further comprise: a gravity sensor and so on.

For example, appearance information on outline, size and color and so on can be acquired through the camera, and meanwhile, an included angle between the camera and a gravity field when the camera acquires the appearance information is determined through the gravy sensor, and then a shooting angle when the camera acquires the appearance information is determined according to the angle. Then, the electronic device makes an analysis and comparison on the appearance information acquired by the camera and the shooting angle of the camera to determine the to-be-identified object.

In order to further improve accuracy of identifying, in the second embodiment of the present disclosure, the electronic device comprises a first identifying means and a second identifying means, wherein the first identifying means is used for determining a first identifying information of the to-be-identified object and the second identifying means is used for determining the second identifying information of the to-be-identified object.

First Example

Figure 7:
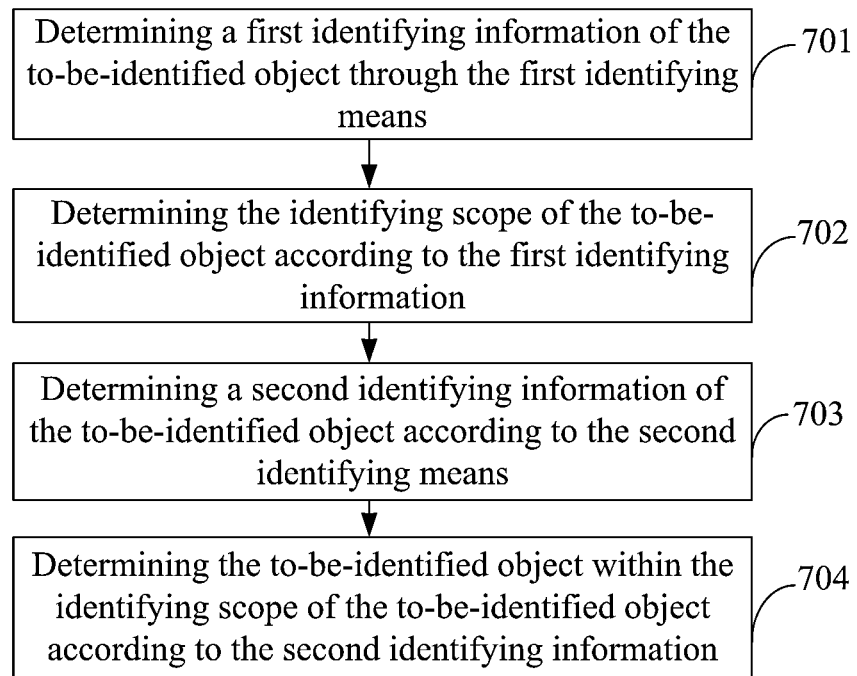
FIG. 7 is a flow chart of a method of identifying a to-be-identified object provided in a second embodiment of the present disclosure.

A method of identifying the to-be-identified object provided in the first example is applied to an electronic device (such as a TPC and so on), wherein the electronic device comprises a first identifying means and a second identifying means. The to-be-identified object is independent of the electronic device, wherein the first identifying means is used for determining a first identifying information of the to-be-identified object and the second identifying means is used for determining the second identifying information of the to-be-identified object. As shown in FIG. 7, the method comprises:

Step 701, determining the first identifying information of the to-be-identified object through the first identifying means.

Wherein the first identifying means can be pressure sensors; correspondingly, the first identifying information is quality information of the to-be-identified object. The quality information comprises position information, weight information and size information of the to-be-identified object, wherein the weight information is the weight of the to-be-identified object.

Illustratively, four pressure sensors can be set on the electronic device. After the to-be-identified object is placed on the electronic device, since a pressure value displayed on the pressure sensor is inversely proportional to a distance from the to-be-identified object to the pressure sensor, ratios of the distances from the to-be-identified object to the four pressure sensors can be determined according to ratios of the pressure values displayed on the four pressure sensors, and then the position of the to-be-identified object can be determined according to the ratio relationship between distances of the four pressure sensors.

The weight of the to-be-identified object can be obtained through the pressure value displayed on any one of the pressure sensors. In particular, the pressure value T and the distance L from the position of the to-be-identified object to the middle position of the electronic device when the to-be-identified object is placed at any random position of the electronic device are recorded. According to T×L=T0×L0 (wherein T0 is the pressure value when the to-be-identified object is placed at the middle position of the electronic device, and L0 is the distance from the to-be-identified object to the pressure sensor when the to-be-identified object is placed at the middle position), the pressure value T0 when the to-be-identified object is placed at the middle position can be obtained. According to the prestored object weight g0 corresponding to per unit pressure suffered by the middle position of the electronic device, the weight value of the to-be-identified object M=T0/g0 can be obtained. Of course, a plurality of corresponding weight values of the to-be-identified object can be firstly obtained through the pressure values of a plurality of pressure sensors set on the electronic device, and then an average weight value can be obtained through averaging the plurality of weight values. In this way, the obtained weight of the to-be-identified object is closer to the true value, and thus identifying can be performed more accurately.

The size information of the to-be-identified object can be obtained through pixel information of a picture of the to-be-identified object shot by any random camera. In particular, the number of pixels Q occupied by the size information of the shot picture and the distance L from the position of the to-be-identified object to the middle position of the electronic device when the to-be-identified object is placed at any random position are recorded. According to Q×L=Q0×L0 (wherein Q0 is the number of pixels occupied by the size information of the shot picture when the to-be-identified object is placed at the middle position of the electronic device, and L0 is the distance from the to-be-identified object to the camera when the to-be-identified object is placed at the middle position), the number of pixels Q0 occupied by the size information of the shot picture when the to-be-identified object is placed at the middle position can be obtained. According to the prestored number of pixels q0 occupied by per unit length of the shot picture at the middle position of the electronic device, the size information of the to-be-identified object can be obtained. For the to-be-identified object with a regular shape, such as a cuboid, a cube or a sphere and so on, the size information may be value of the length, width, height or radius, perimeter and so on of the to-be-identified object. For the to-be-identified object with an irregular shape, the size information may be length of the longest straight line passing through the center of the to-be-identified object, the shortest straight line passing through the center of the to-be-identified object, or the straight line forming certain included angle (for example 90 degrees) with the longest straight line or the shortest straight line. Of course, a plurality of size information corresponding to to-be-identified object can be firstly obtained through the pixel information of the picture of the to-be-identified object shot by a plurality of cameras set on the electronic device, and then an average size can be obtained by averaging the plurality of size information of the to-be-identified object.

Further, the quality information further comprises density information of the to-be-identified object.

Wherein the density information of the to-be-identified object p is p=m/v, m and v respectively representing weight value and volume value of the to-be-identified object. The weight value is weight information of the to-be-identified object, and the volume value can be obtained through the size information of the to-be-identified object.

In addition, the first identifying means may be a camera or similar camera devices. Correspondingly, the first identifying information is appearance information of the to-be-identified object. The appearance information comprises outline information of the to-be-identified object.

Illustratively, a camera can be set on the electronic device. After the to-be-identified object is place on the electronic device, the outline information of the to-be-identified object can be obtained through an edge extracting function of the camera.

Further, the appearance information further comprises color information and image feature information of the to-be-identified object.

Wherein the color information can be directly obtained through the camera, and the image feature information comprises texture structure information of the image and the gray scale information of the image and so on and can be obtained through the existing image algorithm.

Step 702, determining the identifying scope of the to-be-identified object according to the first identifying information.

In particular, first identifying objects having the same values with those of the first identifying information are inquired, and the identifying scope of the to-be-identified object is composed of respective first identifying objects.

When the first identifying information is quality information of the to-be-identified object, the first identifying objects having the same values with those corresponding to the quality information are inquired, and the identifying scope of the to-be-identified object is composed of respective first identifying objects. For example, if the quality information of the to-be-identified object comprises that the weight is 2.5 kg, the identifying scope of the to-be-identified object is composed of all first identifying objects with a weight of 2.5 kg that have been inquired in the data base. Further, if the quality information of the to-be-identified object further comprises that the density is $1.0 \times 10^3$ kg/m$^3$, objects with a density of $1.0 \times 10^3$ kg/m$^3$ are selected from the identifying scope of the to-be-identified object to compose the identifying scope of the to-be-identified object. In this way, an object can be identified more accurately.

When the first identifying information is appearance information of the to-be-identified object, the first identifying objects having the same values with those corresponding to the appearance information are inquired, and the identifying scope of the to-be-identified object is composed of respective first identifying objects. The process in particular is the same as the process in which the identifying scope of the to-be-identified object is composed according to the quality information, details omitted.

Step 703, determining a second identifying information of the to-be-identified object according to the second identifying means.

The step corresponds to step 701. When at step 701, the first identifying means is a pressure sensor and the first identifying information is quality information of the to-be-identified object, accordingly, at step 703, the second identifying means is a camera and the second identifying information is appearance information of the to-be-identified object. When at step 701, the first identifying means is a camera and the second identifying information is appearance information of the to-be-identified object, accordingly, at step 703, the second identifying means is a pressure sensor and the identifying information is quality information of the to-be-identified object.

The specific process at step 703 is the same as the corresponding process at step 701, details omitted.

Step 704, determining the to-be-identified object within the identifying scope of the to-be-identified object according to the second identifying information.

First, determination information of the to-be-identified object is composed according to the second identifying information. When the second identifying information is the appearance information of the to-be-identified object, the determination information comprises values corresponding to the outline information of the to-be-identified object, and can further comprise values corresponding to the color information and the image feature information. When the second identifying information is the quality information of the to-be-identified object, the determination information comprises values corresponding to the weight information and the size information of the to-be-identified object, and further can comprise a value corresponding to the density information.

Next, the to-be-identified object that matches with the determination information is searched within the identifying scope of the to-be-identified object. The first identifying object within the identifying scope of the to-be-identified object that has values closest to or the same with those included the determination information of the to-be-identified object is determined as the to-be-identified object.

Second Example

A method of identifying the to-be-identified object provided in the second example differs from the method provided in the first example in:

The first identifying means is a vibration sensor, and correspondingly, the first identifying information is vibration information of the to-be-identified object. The vibration information comprises position information, vibration mode and size information of the to-be-identified object, wherein the vibration mode refers to the changing relationship of the vibration frequency of the to-be-identified object detected by the vibration sensor with the time. The second identifying means is a camera or similar camera devices. Correspondingly, the second identifying information is appearance information of the to-be-identified object. The appearance information comprises outline information of the to-be-identified object, and further comprises color information and image feature information of the to-be-identified object.

Or, the first identifying means is a camera or similar camera devices. Correspondingly, the first identifying information is appearance information of the to-be-identified object. The appearance information comprises outline information of the to-be-identified object, and further comprises color information and image feature information of the to-be-identified object. The second identifying means is a vibration sensor, and correspondingly, the second identifying information is vibration information of the to-be-identified object. The vibration information comprises position information, vibration mode and size information of the to-be-identified object, wherein the vibration mode refers to the changing relationship of the vibration frequency of the to-be-identified object detected by the vibration sensor with the time.

Below is a detailed specification of the specific process of the method of identifying the to-be-identified object provided in the second example by referring to FIG. 7.

Step 701, determining the first identifying information of the to-be-identified object through the first identifying means.

Wherein the first identifying means is a vibration sensor, and correspondingly, the first identifying information is vibration information of the to-be-identified object. The vibration information comprises position information, vibration mode and size information of the to-be-identified object, wherein the vibration mode refers to the changing relationship of the vibration frequency of the to-be-identified object detected by the vibration sensor with the time.

Illustratively, four vibration sensors are set on the electronic device. After an object is placed on the electronic device, each of the vibration sensors can detect a vibration value transmitted thereto from the vibration that is produced when the to-be-identified object contacts with the electronic device. The vibration value detected by each of the vibration sensors is inversely proportional to a distance from the to-be-identified object to the vibration sensor. Ratios of the distances from the to-be-identified object to four vibration sensors can be determined according to the ratios of the vibration values displayed on the four vibration sensors, and then the position of the to-be-identified object can be determined according to the ratios between distances from the four vibration sensors.

The vibration mode of the to-be-identified object can be obtained through the changing relationship of the vibration frequency over any random vibration sensor with the time. In particular, the vibration frequency Fi at the $i^{th}$ vibration time and the distance L from the position of the to-be-identified object to the middle position of the electronic device when the to-be-identified object is placed at any random position of the electronic device are recorded, according to Fi×L=Fi0×L0 (wherein Fi0 is the vibration frequency at the $i^{th}$ vibration time when the to-be-identified object is placed at the middle position of the electronic device, and L0 is the distance from the to-be-identified object to the vibration sensor when the to-be-identified object is placed at the middle position of the electronic device), the vibration frequency Fi0 at the $i^{th}$ vibration time when the to-be-identified object is placed at the middle position can be obtained. The vibration frequency at each vibration time when the to-be-identified object is placed at the middle position can be obtained through transforming the vibration frequency Fi at each vibration time when the to-be-identified object is placed at the current position as described above, and thus the changing relationship of the vibration frequency with the time when the to-be-identified object is placed at the middle position, i.e., the vibration mode when the to-be-identified object is placed at the middle position, can be obtained. Of course, it can firstly average the vibration frequencies over a plurality of vibration sensors set on the electronic device at the same vibration time to obtain an average vibration frequency Fi' of the to-be-identified object at the time. Then, according to Fi'×L=H0×L0 (wherein Fi0' is the average vibration frequency at the $i^{th}$ vibration time when the to-be-identified object is placed at the middle position of the electronic device, and L0 is the distance from the to-be-identified object to the vibration sensor when the to-be-identified object is placed at the middle position of the electronic device), the average vibration frequency Fi0' at the $i^{th}$ vibration time when the to-be-identified object is placed at the middle position can be obtained. An average vibration mode when the to-be-identified object is placed at the middle position can be obtained according to the changing relationship of the average vibration frequency with the time at each vibration time when the to-be-identified object is placed at the middle position. In this way, the obtained average vibration mode of the to-be-identified object is closer to the true vibration situation, and thus the object can be identified more accurately.

The obtaining of the size information of the to-be-identified object has been specified in detail at step 701 of the first example, details omitted.

In addition, the first identifying means may also be a camera or similar camera devices, and correspondingly, the first identifying information is the appearance information of the to-be-identified object. The appearance information comprises the outline information of the to-be-identified object. The obtaining of the above information has been specified in detail at step 701 of the first example, details omitted.

Step 702, determining the identifying scope of the to-be-identified object according to the first identifying information.

In particular, first identifying objects having the same values with those of the first identifying information are inquired, and the identifying scope of the to-be-identified object is composed of respective first identifying objects.

When the first identifying information is the vibration information of the to-be-identified object, the first identifying objects having the same values with those corresponding to the vibration information are inquired, and the identifying scope of the to-be-identified object is composed of respective first identifying object. For example, if the vibration information of the to-be-identified object comprises that the vibration mode is a sinusoid, the identifying scope of the to-be-identified object is composed of all first identifying objects with a vibration mode of a sinusoid that have been inquired in the data base.

When the first identifying information is the appearance information of the to-be-identified object, the first identifying objects having the same values with those corresponding to the appearance information are inquired, and the identifying scope of the to-be-identified object is composed of respective first identifying objects. The process in particular is the same as the process in which the identifying scope of the to-be-identified object is composed according to the vibration information, details omitted.

Step 703, determining the second identifying information of the to-be-identified object according to the second identifying means.

The step corresponds to step 701. When at step 701, the first identifying means is a vibration sensor and the first identifying information is the vibration information of the to-be-identified object, accordingly, at step 703, the second identifying means is a camera and the second identifying information is the appearance information of the to-be-identified object. When at step 701, the first identifying means is a camera and the first identifying information is the appearance information of the to-be-identified object, accordingly, at step 703, the second identifying means is a vibration sensor and the identifying information is the vibration information of the to-be-identified object.

The specific process is the same as the corresponding process at step 701, details omitted.

Step 704, determining the to-be-identified object within the identifying scope of the to-be-identified object according to the second identifying information.

First, determination information of the to-be-identified object is composed according to the second identifying information. When the second identifying information is the appearance information of the to-be-identified object, the determination information comprise values corresponding to the outline information of the to-be-identified object, and can further comprise values corresponding to the color information and the image feature information of the to-be-identified object. When the second identifying information is the vibration information of the to-be-identified object, the determination information comprises values corresponding to the vibration information and the size information of the to-be-identified object.

Next, the to-be-identified objects that match with the determination information are searched within the identifying scope of the to-be-identified object. The first identifying object within the identifying scope that has the values closest to or the same with those of the determination information of the to-be-identified object is determined as the to-be-identified object.

The method of identifying the to-be-identified object provided in the present embodiment determines the identifying scope of the to-be-identified object through the first identifying information provided by the first identifying means, and then determines the to-be-identified object within the identifying scope according to the second identifying information provided by the second identifying means. In this way, the object can be identified accurately and conveniently.

Figure 8:
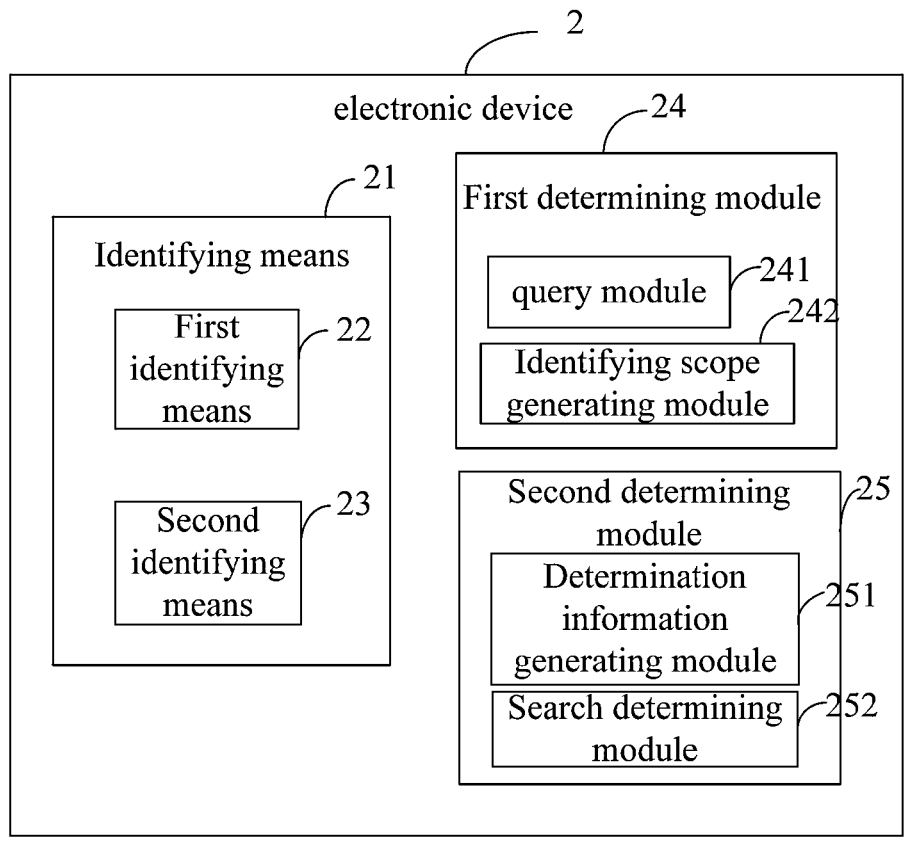
FIG. 8 is an illustrative diagram of structure of an electronic device provided in the second embodiment of the present disclosure.

The present embodiment further provides an electronic device 2. As shown in FIG. 8, comprised is an identifying means 21. The identifying means 21 comprises at least one first identifying means 22 and at least one second identifying means 23, wherein the first identifying means 22 is used for determining the first identifying information of the to-be-identified object and the second identifying means 23 is used for determining the second identifying information of the to-be-identified object.

The electronic device 2 further comprises a first determining module 24 for determining the identifying scope of to-be-identified object according to the first identifying information; and a second determining module 25 for determining the to-be-identified object within the identifying scope of the to-be-identified object according to the second identifying information.

Further, the first determining module 24 may comprise: a query module 241 for inquiring first identifying objects having the same values with those of the first identifying information; and an identifying scope generating module 242 for composing the identifying scope of the to-be-identified object by respective first identifying objects.

The second determining module 25 may comprise: a determination information generating module 251 for composing determination information of the to-be-identified object according to the second identifying information; and a search determining module 252 for searching the to-be-identified object that matches with the determination information within the identifying scope of the to-be-identified object.

In particular, the first identifying means 22 is a pressure sensor, and the first identifying information is quality information of the to-be-identified object; the second identifying means 23 is a camera, and the second identifying information is appearance information of the to-be-identified object. Or, the first identifying means 22 is a camera, and the first identifying information is appearance information of the to-be-identified object; the second identifying means 23 is a pressure sensor, and the second identifying information is quality information of the to-be-identified object.

Wherein the quality information comprises position information, weight information, size information and density information of the to-be-identified object; and the appearance information comprises outline information, color information and image feature information of the to-be-identified object.

Or, the first identifying means 22 is a vibration sensor, and the first identifying information is vibration information of the to-be-identified object; the second identifying means 23 is a camera, and the second identifying information is appearance information of the to-be-identified object. Or, the first identifying means 22 is a camera, and the first identifying information is appearance information of the to-be-identified object; the second identifying means 23 is a vibration sensor, and the second identifying information is vibration information of the to-be-identified object.

Wherein the vibration information comprises position information, vibration mode and size information of the to-be-identified object; and the appearance information comprises outline information, color information and image feature information of the to-be-identified object.

Third Embodiment

Figure 9:
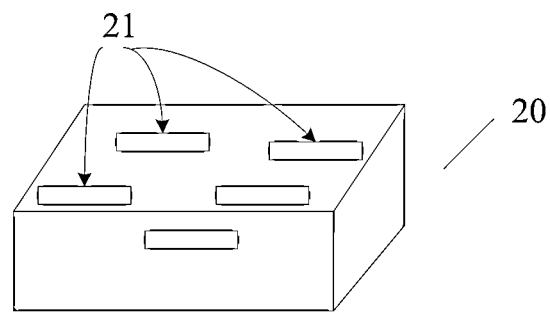
FIG. 9 is an illustrative diagram of a to-be-identified object provided in a third embodiment of the present disclosure.

According to the third embodiment of the present disclosure, the display screen of electronic device comprises: an electric field layer for forming an electric field 111, and the electric field 111 changes when a to-be-identified object 20 is placed in the electric field 111. As shown in FIG. 9, conductors 21 are set in the to-be-identified object 20; preferably, a conductor distribution inside the to-be-identified object 20 is a two-dimensional distribution or a three-dimensional distribution. More to-be-identified objects can be identified within a limited space through making the conductors form a two-dimensional distribution or a third-dimensional distribution spatially.

Figure 10:
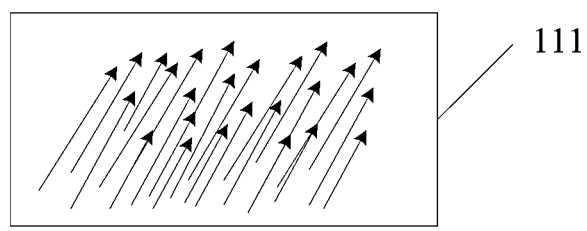
FIG. 10 is an electric field distribution diagram provided in the third embodiment of the present disclosure.
Figure 11:
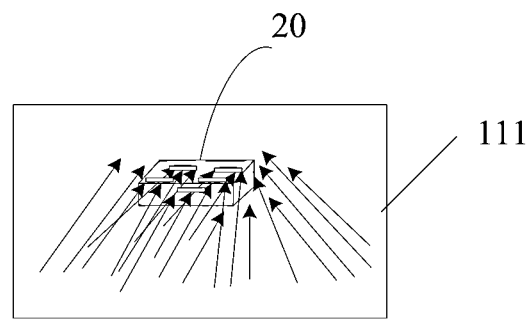
FIG. 11 is another electric field distribution diagram provided in the third embodiment of the present disclosure.

As shown in FIG. 10, the electric field 111 does not change when the to-be-identified object 20 is not placed in the electric field 111. As shown in FIG. 11, the electric field 111 changes when the to-be-identified object 20 is placed in the electric field 11

Practically, the conductors 21 can be composed using metal components in the internal structure of the to-be-identified object itself; optionally, the conductors 21 can be set on the house body of the surface of the to-be-identified object.

In addition, the identifying sub-unit 311 of the electronic device as shown in FIG. 5 further comprises a detecting unit 12 for detecting the conductor distribution in the to-be-identified object according to changing information of the electric field and determining encoding information of the to-be-identified object according to the conductor distribution; and a processing unit 13 for identifying the to-be-identified object according to the encoding information of the to-be-identified object and prestored encoding information in the electronic device. Further, the processing unit 13 outputs an identification result to the display screen.

In particular, in the process of identifying of the processing unit 13, when the encoding information of the to-be-identified object matches with one of the prestored encoding information, an object represented by the matched prestored encoding information is the to-be-identified object, so that the to-be-identified object is identified.

Thus it can be seen that, the present embodiment sets different conductor distributions on each of the to-be-identified objects, after the to-be-identified object is placed in the electric field, the detecting unit determines the encoding information, and the encoding information of the to-be-identified object is compared with the prestored encoding information, such that the to-be-identified object is identified.

As described above, the electronic device further comprises a sensor unit for acquiring image information of the to-be-identified object; preferably, the sensor unit comprises a camera or an optical sensor.

In this case, the processing unit 13 can identify the to-be-identified object according to the image information of the to-be-identified object, the prestored image information in the electronic device, the encoding information of the to-be-identified object and the prestored encoding information in the electronic device. As such, acquiring an identification result according to two kinds of information guarantees the accuracy of identifying.

Further, the detecting unit 12 is further used for detecting an electric field capacitance of the electric field.

The processing unit 13 is further used for calculating distance between the to-be-identified object and the electric field layer according to the electric field capacitance. Further, the processing unit 13 can output a calculation result to the display screen, so as to provide users with more intuitive and accurate information.

As such, the distance between the to-be-identified object and the electric field layer is calculated according to the electric field capacitance between the to-be-identified object and the electric field layer, so as to analyze whether the to-be-identified object is far away from or close to the electric field layer.

Figure 12:
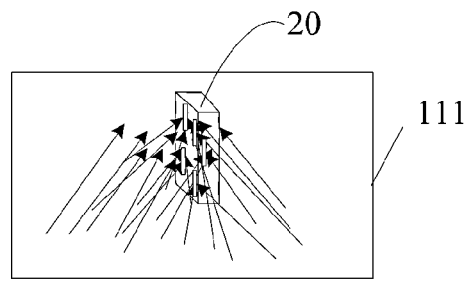
FIG. 12 is another electric field distribution diagram provided in the third embodiment of the present disclosure.
Figure 13:
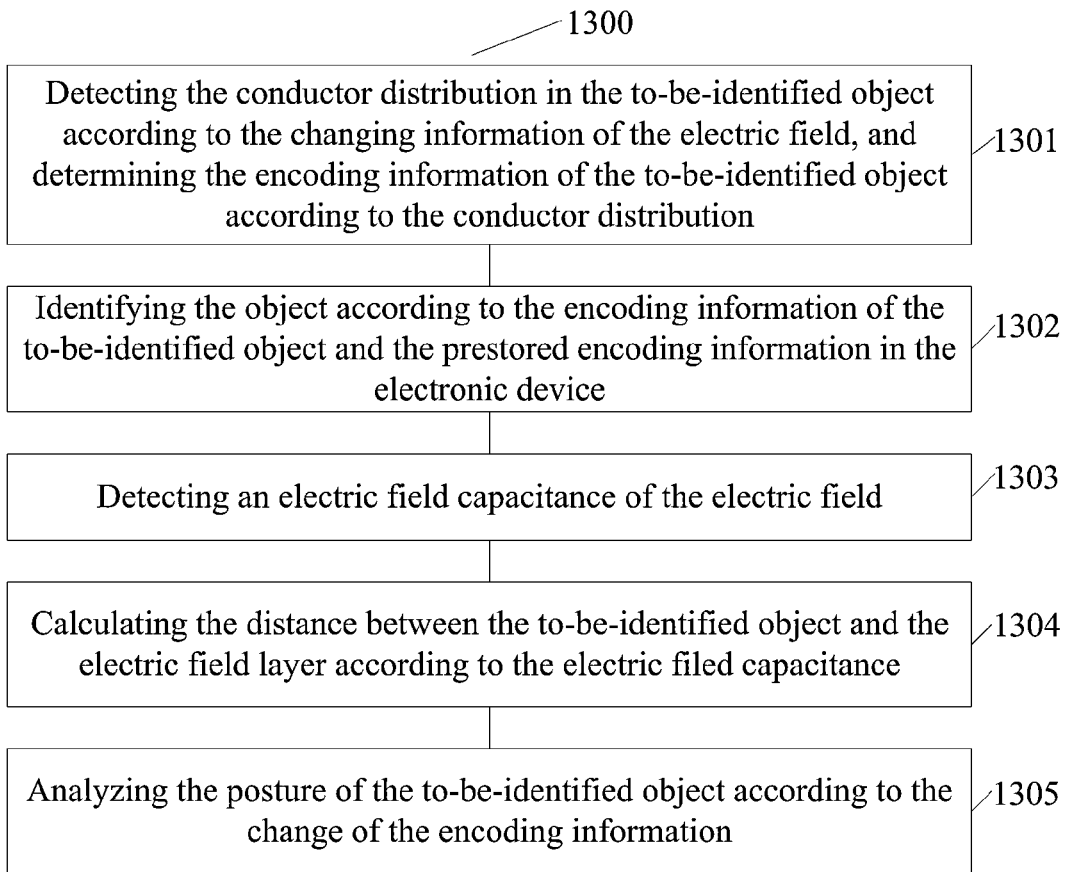
FIG. 13 is a flow chart of a method of identifying a to-be-identified object provided in the third embodiment of the present disclosure.

Further, the processing unit 13 is further used for analyzing posture of the to-be-identified object according to change of the encoding information Illustratively, as shown in FIG. 12, users can randomly rotate the to-be-identified object in the electric field to change its posture in the space. After the to-be-identified object is rotated in the electric field, the encoding information formed in the electric field by the conductor distribution in the to-be-identified object changes, which causes that arrangement distribution of the whole electric field matrix different from that before the to-be-identified object is rotated. The processing unit identifies the posture after the to-be-identified object is rotated according to the changing condition of the encoding information of the to-be-identified object.

Further, the processing unit 13 can output the changing condition of the posture of the to-be-identified object to the display screen, thus making it convenient for users to know posture information of the to-be-identified object.

It needs to be specified that, the result information obtained after the calculation, the analysis and so on of the processing unit in the present embodiment can also be output to an external device (for example a computer and so on) for a subsequent use, to which the present disclosure does not limit.

Thus it can be seen that, the electronic device provided in the present embodiment of the present disclosure is capable of identifying the object through establishing an electric layer on the display screen, detecting the encoding information and the electric filed capacitance in the electric field by the detecting unit, and performing operations such as identifying, analyzing and calculating and so on by the processing unit, which makes it convenient for operation of users and improves experience of users.

As shown in FIG. 7, the present embodiment further provides a method 1300 of identifying the to-be-identified object being applied to an electronic device. The electronic device comprises a display screen. The display screen comprises: an electric field layer for forming an electric field, and the electric filed changes when the to-be-identified object is placed in the electric field; wherein conductors are set in the to-be-identified object; preferably, the conductor distribution in the to-be-identified object is a two-dimensional distribution or a three-dimensional distribution.

The method comprises the following steps 1301-1302:

Step 1301, detecting the conductor distribution in the to-be-identified object according to the changing information of the electric field, and determining the encoding information of the to-be-identified object according to the conductor distribution;

Step 1302, identifying the object according to the encoding information of the to-be-identified object and the prestored encoding information in the electronic device.

As described above, the electronic device further comprises a sensor unit for acquiring image information of the to-be-identified object. Preferably, the sensor unit comprises a camera or an optical sensor. Further, step 1302 particularly comprises: identifying the to-be-identified object according to the image information of the to-be-identified object and the prestored image information in the electronic device, the encoding information of the to-be-identified object and the prestored encoding information in the electronic device.

Thus it can be seen that, different conductor distributions are set on each of the to-be-identified objects, and after the to-be-identified object is placed in the electric field, the detecting unit determines the encoding information of the to-be-identified object, and the encoding information of the to-be-identified object is compared with the prestored encoding information, such that the to-be-identified object is identified; further, an identification result is obtained according to two kinds of information including the image information and the encoding information, such that the accuracy of identifying is guaranteed.

The method further comprises the following steps 1303 and 1304.

Step 1303, detecting an electric field capacitance of the electric field;

Step 1304, calculating the distance between the to-be-identified object and the electric field layer according to the electric filed capacitance.

As such, the distance between the to-be-identified object and the electric field can be calculated according to the electric field capacitance between the to-be-identified object and the electric field layer, so as to analyze whether the to-be-identified object is far away from or close to the electric field layer.

The method further comprises the following step 1305.

Step 1305, analyzing the posture of the to-be-identified object according to the change of the encoding information. In particular, after the to-be-identified object is rotated in the electric field, the encoding information formed in the electric field by the conductor distribution in the to-be-identified object changes, which causes that arrangement distribution of the whole electric field matrix different from that before the to-be-identified object is rotated. Thus, the posture after the to-be-identified object is rotated is identified according to the changing condition of the encoding information of the to-be-identified object.

The method of identifying provided in the present embodiment is capable of identifying the object through establishing an electric layer on the display screen, detects the encoding information and the electric field capacitance in the electric field by the detecting unit, and performing operations such as identifying, analyzing and calculating and so on by the processing unit, which makes it convenient for operation of users and improves experience of users.

Fourth Embodiment

Provided is a to-be-identified object according to the fourth embodiment of the present disclosure. Here, the to-be-identified object according to the present embodiment may be a to-be-identified object of a tag type. The to-be-identified object can comprise a substrate and at least one electric conductor. The substrate can be implemented by a metal substrate or a non-metal substrate and can possess a first surface and a second surface opposite to the first surface. At least one electric conductor can be implemented by any random conductive material and is set on a preset area of the first surface of the substrate. In addition, the second surface of the substrate is able to connected (for example, adhere) to objects such as a mobile phone, a TPC and a cup and so on. In this case, when the to-be-identified object according to the present embodiment of the present disclosure is adhered to a specific object, and at least one electric conductor on the first surface of the substrate is contacted with a touch screen of the electronic device (for example, a touch information desk and so on), the at least one electric conductor can compose an identity for identifying the specific object.

Here, a pit array can be set on the first surface of the substrate, and at least one electric conductor is set on the preset pits in the pit array. Here, the pit array can be a M×N pit array, that is, the pit array can be an array having M rows, N columns and M×N numbers. Here, M and N can be an integer larger than or equal to 1. In this case, a pattern or a shape being composed of at least one electric conductor in the M×N pit array can form an object corresponding to the to-be-identified object identified by users. For example, one electric conductor in the M×N pit array may represent that the object corresponding to the to-be-identified object is a mobile phone, while two electric conductors (the two electric conductors form a straight line) in the M×N pit array may represent a cup and so on.

In addition, according to another example of the present embodiment of the present disclosure, a triangular structure can be formed using three electric conductors to identify the corresponding object. In particular, different objects can be identified according to different shapes of triangles being composed of the three electric conductors.

In this case, for the M×N pit array, it is the best that M is larger than or equal to 3 and N is larger than or equal to 3.

Below will be a description of an example by referring to FIGS. 14A and 14B. The to-be-identified object as shown in FIG. 14 may possess 4×4 (M and N are respectively 4) pit array.

Figure 14A:
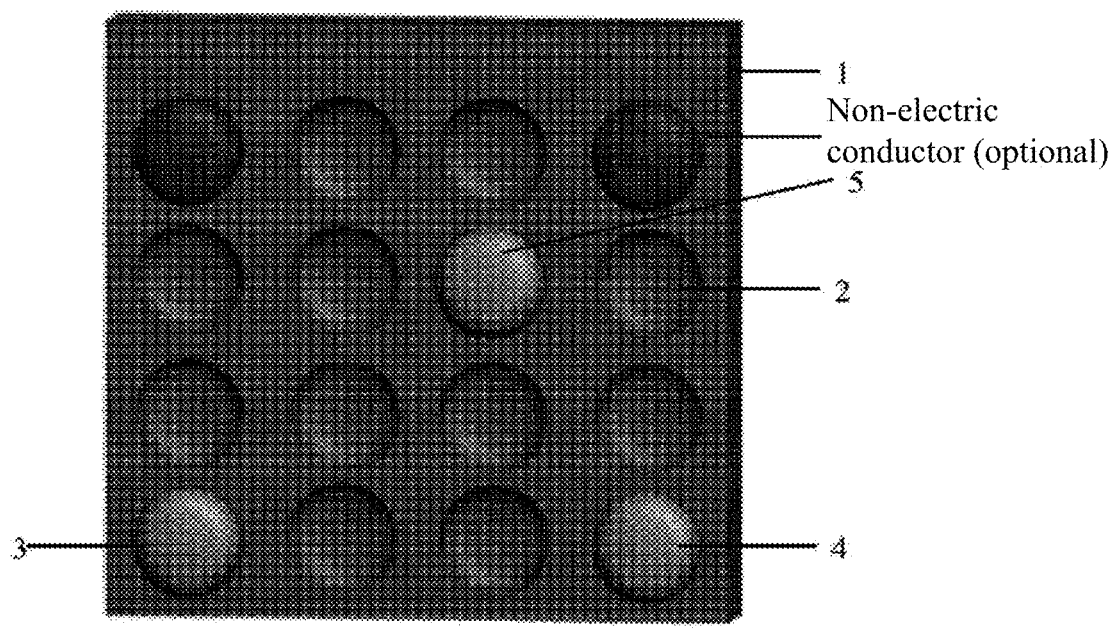
FIGS. 14A and 14B are illustrative diagrams of a to-be-identified object according to a fourth embodiment of the present disclosure.

As shown in FIG. 14A, the to-be-identified object according to the present embodiment of the present disclosure comprises a substrate 1, a pit array 2, a first electric conductor 3, a second electric conductor 4 and a third electric conductor 5. Here, the first electric conductor 3, the second electric conductor 4 and the third electric conductor 5 are respectively set on different pits in the pit array 2 on the first surface of the substrate 1, and the first electric conductor 3, the second electric conductor 4 and the third electric conductor 5 form a triangle structure.

Here, the thickness of the first electric conductor 3, the second electric conductor 4 and the third electric conductor 5 needs to be larger than the depth of the pit in the pit array 2, such that the first electric conductor 3, the second electric conductor 4 and the third electric conductor 5 can contact with the touch screen of the electronic device respectively when the first surface of the substrate 1 contacts with the touch screen of the electronic device, such that the electronic device can sense the first electric conductor 3, the second electric conductor 4 and the third electric conductor 5. Thus, the shape of the triangle being composed of the first electric conductor 3, the second electric conductor 4 and the third electric conductor 5 can be determined based on the positions of the first electric conductor 3, the second electric conductor 4 and the third electric conductor 5 on the touch screen. For example, the triangle being composed of the first electric conductor 3, the second electric conductor 4 and the third electric conductor 5 as shown in FIG. 14A may represent a mobile phone, while the triangle being composed of the first electric conductor 3, the second electric conductor 4 and the third electric conductor 5 as shown in FIG. 14B may represent a cup and so on.

In addition, since the random arrangement of the first electric conductor 3, the second electric conductor 4 and the third electric conductor 5 in the pit array 2 will make it possible to occur that the positions of the first electric conductor 3, the second electric conductor 4 and the third electric conductor 5 may be different but the shapes of the triangles composed thereof may be of the same. Therefore, in another example, the positions of the first electric conductor 3 and the second electric conductor 4 can be fixed, and a type and/or a model of the object corresponding to the to-be-identified object can be determined according to the position of the third electric conductor 5.

For example, as shown in FIG. 14A, the first electric conductor 3 and the second electric conductor 4 can be set in the downmost row of the pit array 2 (i.e., the $4^{th}$ row from the top), and the first electric conductor 3 and the second electric conductor 4 can be set at two ends (the two pits at the longest distance) of the same row respectively. In this case, as shown in FIGS. 14A and 14B, since the two points (for example, the first electric conductor 3 and the second electric conductor 4) in the triangle being composed of the first electric conductor 3, the second electric conductor 4 and the third electric conductor 5 have been fixed and one side in the composed triangle has been fixed, triangles with different shapes can be formed through changing the position of the third electric conductor 5. In this case, triangles with different shapes can represent the type and/or model of the object corresponding to the to-be-identified object, and the to-be-identified objects having different shapes of triangles can be assigned with respect to the type and/or model of objects, so that the electronic device can identify. For example, the triangle being composed of the first electric conductor 3, the second electric conductor 4 and the third electric conductor 5 as shown in FIG. 14A may represent a mobile phone, while the triangle being composed of the first electric conductor 3, the second electric conductor 4 and the third electric conductor 5 as shown in FIG. 14B may represent a cup and so on. In addition, in another example, in order to avoid the connecting line formed between the third electric conductor 5 and the first electric conductor 3 or the second electric conductor 4 and the connecting line formed between the first electric conductor 3 and the second electric conductor 4 from being of the same shape (it may be mistaken by the electronic device as a fixed connecting line formed between the first electric conductor 3 and the second electric conductor 4), non-electric conductors can be set at two ends (the two pits at the longest distance) of the top line (i.e., the $1^{st}$ line from the top) of the 4×4 pit array as shown in FIG. 14A or FIG. 14B, so as to avoid the above situation.

Based on the above configurations, the to-be-identified object (the second surface of the substrate 1) according to the present embodiment of the present disclosure is connected to a specific object (being adhered or absorbed to the bottom or the back of the object), and the side adhered to the to-be-identified object is placed on the touch screen of the electronic device, such that the electronic device can determine the positions of the first electric conductor 3, the second electric conductor 4 and the third electric conductor 5 on the substrate 1 on the touch screen of the electronic device through the touch screen thereof when the first electric conductor 3, the second electric conductor 4 and the third electric conductor 5 on the substrate 1 contact with the touch screen of the electronic device. Here, it needs to be noted that, the touch screen of the electronic device can be a capacitive touch screen. In this case, since the first electric conductor 3, the second electric conductor 4 and the third electric conductor 5 are electric conductors, when the first electric conductor 3, the second electric conductor 4 and the third electric conductor 5 contact with or close to the touch screen of the electronic device, the capacitance at the position of a contact or a closeness will be influenced, and thus the electronic device can determine the contact positions of the first electric conductor 3, the second electric conductor 4 and the third electric conductor 5 on the touch screen.

Then, the electronic device can determine the structure (shape) of the triangle being composed of the first electric conductor 3, the second electric conductor 4 and the third electric conductor 5 based on the positions of the first electric conductor 3, the second electric conductor 4 and the third electric conductor 5 on the touch screen. In particular, the sides of the triangle as well as the included angles between the sides can be obtained according to the positions of the first electric conductor 3, the second electric conductor 4 and the third electric conductor 5 on the touch screen, such that the shape of the triangle will be obtained. Then, after the electronic device determines the shape of the triangle being composed of the first electric conductor 3, the second electric conductor 4 and the third electric conductor 5, the electronic device can determine the type and/or model of the object to which the to-be-identified object is adhered, based on the structure (shape) of the triangle. Here, identifying information corresponding to the triangle being composed of the first electric conductor 3, the second electric conductor 4 and the third electric conductor 5 on the to-be-identified object can be prestored in the electronic device (for example, in a storage). In this case, after the electronic device obtains the shape of the triangle being composed of the first electric conductor 3, the second electric conductor 4 and the third electric conductor 5, the electronic device can compare the shape of the triangle with the prestored identifying information, and determine the type and/or model of the object contacting with the touch screen when the match thereof is found.

In addition, in another example, the electronic device can further determine the placing direction of the object based on the orientation of the structure (shape) of the triangle being composed of the first electric conductor 3, the second electric conductor 4 and the third electric conductor 5. Here, since the electronic device has identified the shape of the triangle and the object corresponding thereto, the placing direction of the object can be determined through identifying the direction of the vertex of the triangle being composed of the third electric conductor 5, or the orientation of the triangle can be determined through the included angle between the connecting line formed between the first electric conductor 3 and the second electric conductor 4 and a horizontal datum line. Here, it needs to be noted that, it needs to associate the orientation of the shape of the triangle being composed of the first electric conductor 3, the second electric conductor 4 and the third electric conductor 5 on the to-be-identified object with the orientation of the object to which the to-be-identified object is adhered (for example, the pointing direction of one vertex of the triangle is consistent with the horizontal or vertical direction of the object), such that the electronic device can determine the placing direction of the object through identifying the orientation of the triangle.

The above is described by taking the pit array 2 being 4×4 pit array as an example. Here, the pit array 2 is not limited to the 4×4 pit array as shown in FIGS. 14A and 14B. The pit array 2 can possess other number of rows or columns as long as it is allowed that the three electric conductors on the pits in the pit array can compose a triangle and the positions of the three electric conductors are reasonably selected so as to avoid the triangle from being repeated.

Figure 14B:
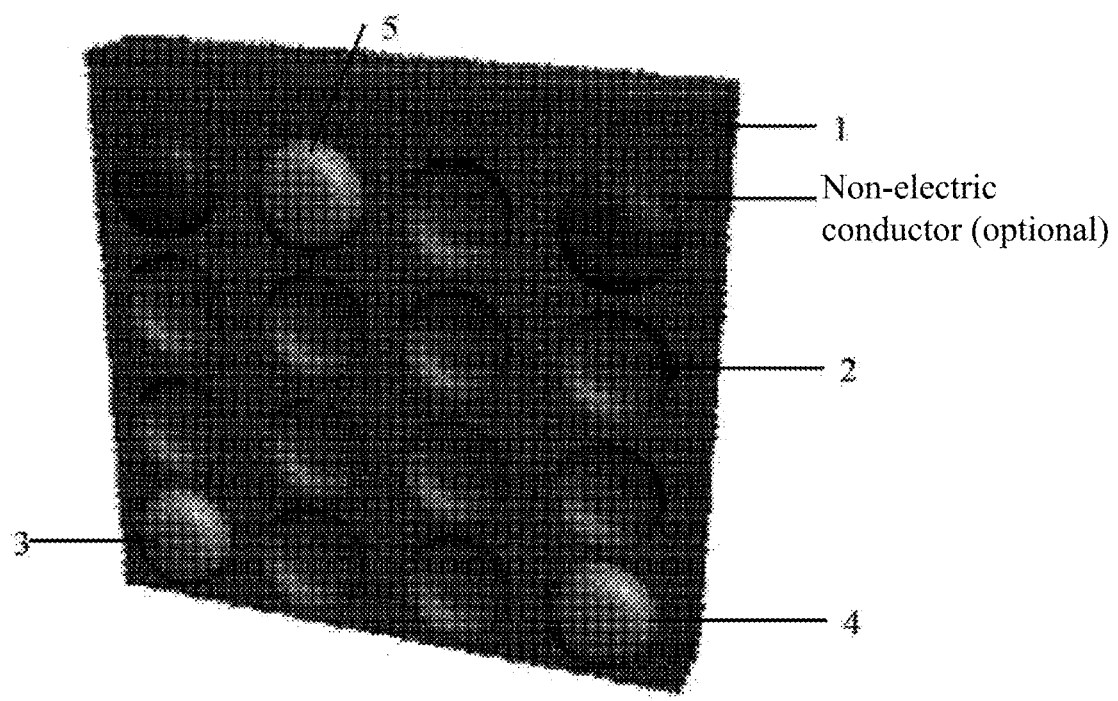

In addition, according to the present embodiment of the present disclosure, the substrate as shown in FIG. 14A or 14B can be a conductive substrate, and the electric conductor can be set on the preset pits on the first surface of the substrate by means of magnetic connection (the electric conductor or substrate is a magnet). In addition, the substrate can be a non conductive substrate, while the electric conductor can be connected with the substrate by means of adhering.

The to-be-identified object according to the present embodiment of the present disclosure is described above. In the above embodiment, the to-be-identified object can be adhered to a specific object to identify the specific object. However, the present disclosure is not limited thereto. Further, the to-be-identified object can be directly formed on a specific device. Below will be a description of a specific device according to the present embodiment of the present disclosure. Here, the specific device according to the present embodiment of the disclosure (for example, a smart mobile phone, a TPC, a cup and so forth) can comprise a house body. Here, the to-be-identified object can be set on the specific surface of the house body of the specific device. For example, the to-be-identified object can be solidified on the surface of the house body such as the back or the bottom of the specific device.

Here, similar to the previous description, the to-be-identified object can comprise a substrate. The substrate possesses a first surface. Here, it needs to be noted that, the substrate of the to-be-identified object may be a substrate being solidified on the specific surface of the house body, or may be a part of the specific surface of the house body. At least one electric conductor is implemented by any random conductive material, and is set on the preset area of the first surface of the substrate. Here, when the specific device contacts with the touch screen of the electronic device (for example, an information desk with a touch screen) to make the touch screen of the electronic device contact with the surface including the to-be-identified object and when the touch screen sensors the at least one electric conductor, the at least one electronic conductor composes an identity that makes the electronic device identify the specific device uniquely.

Here, similar to the previous description, a pit array can be set on the first surface of the substrate, and at least one electric conductor is set on the preset pits in the pit array, and thus the at least one electric conductor on the preset pits can form a predetermined shape. Here, the substrate can be a conductive substrate, and the at least one electric conductor is set on the preset pits on the first surface of the substrate by means of magnetic connection (the electric conductor or the substrate is a magnet). In this case, the predetermined shape being composed of the at least one electric conductor on the to-be-identified object on different specific devices needs to be different, and thus the at least one electric conductor on the to-be-identified object on different specific devices can be composed of an identity for making the electronic device identify the specific device uniquely. Here, the pit array may be M×N pit array. For example, one conductor in the M×N pit array can represent that the specific device corresponding to the to-be-identified object is a mobile phone, while two conductors (the two form a straight line) in the M×N pit array can represent a cup and so on.

In addition, in another example, a structure of a triangle can be formed using three electric conductors to identify different devices. In this case, for the M×N pit array, it is the best that M is larger than or equal to 3 and N is larger than or equal to 3. Below will be a description by taking the to-be-identified object having the M×N pit array as an example.

Here, the to-be-identified object of the specific device can comprise a substrate, a pit array, a first electric conductor, a second electric conductor and a third electric conductor. Here, the first electric conductor, the second electric conductor and the third electric conductor can be set respectively on different pits in the pit array, and the first electric conductor, the second electric conductor and the third electric conductor form a triangle structure. Here, the thickness of the first electric conductor, the second electric conductor and the third electric conductor needs to be greater than the depth of the pit in the pit array, such that the first electric conductor, the second electric conductor and the third electric conductor can contact with the touch screen of the electronic device respectively when the surface of the specific device having the to-be-identified object solidified thereon contacts with the touch screen of the electronic device, such that the electronic device can sense the first electric conductor, the second electric conductor and the third electric conductor. Thus, the shape of the triangle being composed of the first electric conductor, the second electric conductor and the third electric conductor can be determined based on the positions of the first electric conductor, the second electric conductor and the third electric conductor on the touch screen and the type of the specific device having the to-be-identified object solidified thereon can be determined.

In addition, since the random arrangement of the first electric conductor, the second electric conductor and the third electric conductor in the pit array will make it possible to occur that the positions of the first electric conductor, the second electric conductor and the third electric conductor may be different but the shapes of the triangles being composed thereof may be of the same. Therefore, according to another example of the present embodiment of the present disclosure, the positions of the first electric conductor and the second electric conductor can be fixed, and a type and/or a model of the specific device corresponding to the to-be-identified object can be determined according to the position of the third electric conductor. For example, similar to the descriptions of FIGS. 14A and 14B, the first electric conductor and the second electric conductor can be set in the downmost row of the pit array, and the first electric conductor and the second electric conductor can be set at two ends of the same row respectively. In this case, since the two points in the triangle being composed of the first electric conductor, the second electric conductor and the third electric conductor have been fixed and one side of the composed triangle has been fixed, triangles with different shapes can be formed through changing the position of the third electric conductor. In this case, triangles with different shapes can represent the type and/or model of the specific device corresponding to the to-be-identified object, and the to-be-identified objects having different shapes of triangles can be assigned with respect to the type and/or model of the specific device, so that the electronic device can identify.

In addition, the orientation of the structure (shape) of the triangle being composed of the first electric conductor 3, the second electric conductor 4 and the third electric conductor 5 can further be used for determining the placing direction of the specific device. Here, since different shapes of triangles correspond to different specific devices and the two points of the triangles are fixed, the placing direction of the specific object can be determined through identifying the direction of the vertex of the triangle being composed of the third electric conductor, or the orientation of the triangle can be determined through the included angle between the connecting line formed between the first electric conductor 3 and the second electric conductor 4 and a horizontal datum line. Here, it needs to be noted that, it needs to associate the orientation of the shape of the triangle being composed of the first electric conductor 3, the second electric conductor 4 and the third electric conductor 5 on the to-be-identified object with the orientation of the specific device (for example, the pointing direction of one vertex of the triangle is consistent with the horizontal or vertical direction of the specific device), such that the electronic device can determine the placing direction of the specific device through identifying the orientation of the triangle.

Here, the electronic device can be an information desk having a touch screen. The touch screen can be implemented by any random capacitive touch screen, and the detecting unit 12 as described above can sense an object (for example, an electric conductor) contacting with or being close to the touch screen.

The processing unit 13 as described above can be implemented by any random processor or micro processor. The processing unit 13 can determine the position of a contact or a closeness based on the touch screen under the control of the preset touch applications.

In addition, the electronic device further comprises a storing unit for storing a plurality of identifying information. The storing unit can be implemented by a flash memory or hardware. Here, each identifying information is used for indicating one different object, and each identifying information can correspond to a specific shape (i.e., the shape being composed of at least one electric conductor on the to-be-identified object).

In the present embodiment, when the specific object having the to-be-identified object contacts with the touch screen of the electronic device, the touch screen will sense at least one contact point. Here, the at least one contact point is formed by at least one electric conductor on the to-be-identified object of the specific object. Then, the processing unit determines a first shape according to the sensed at least one point contact, and compares the first shape with the plurality of identifying information. Then, the processing unit can determine the type or model of the specific object based on a comparison result.

Here, it needs to be noted that, the to-be-identified object comprises a substrate. The first surface of the substrate possesses a pit array. Here, at least one electric conductor is set on the preset pits in the pit array. Similar to the previous description, a pit array can be set on the first surface of the substrate, and at least one electric conductor is set on the preset pits in the pit array, and thus the at least one electric conductor on the preset pits can form a predetermined shape. Here, the substrate can be a conductive substrate, and the at least one electric conductor is set on the preset pits on the first surface of the substrate by means of magnetic connection (the electric conductor or the substrate is a magnet). Here, the pit array may be M×N pit array. In addition, in another example, three electric conductors can be used to form a triangle structure, so as to identify different devices. In this case, for the M×N pit array, it is the best that M is larger than or equal to 3 and N is larger than or equal to 3. Below will be a description by taking the to-be-identified object having the M×N pit array as an example. Here, similar to the previous description, the to-be-identified object can comprise a first electric conductor, a second electric conductor and a third electric conductor, and the three electric conductors compose a triangle structure. In another example, the positions of the first electric conductor and the second electric conductor can be fixed, and a type and/or a model of the specific device corresponding to the to-be-identified object can be determined through the position of the third electric conductor. For example, similar to the descriptions to FIGS. 14A and 14B, the first electric conductor and the second electric conductor can be set in the downmost row of the pit array, and the first electric conductor and the second electric conductor are set at two ends of the same row respectively. In this case, since the two points in the triangle being composed of the first electric conductor, the second electric conductor and the third electric conductor have been fixed and one side of the composed triangle has been fixed, triangles with different shapes can be formed through changing the position of the third electric conductor. In this case, triangles with different shapes can represent the type and/or model of the specific device corresponding to the to-be-identified object, and the to-be-identified objects having different shapes of triangles can be assigned with respect to the type and/or model of the specific device, so that the electronic device can identify.

In this case, the side to which the to-be-identified object is adhered is placed on the touch screen of the electronic device, such that the processing unit can determine the positions of the contact points of the first electric conductor, the second electric conductor and the third electric conductor on the touch screen when the first electric conductor, the second electric conductor and the third electric conductor on the substrate of the to-be-identified object are sensed by the touch screen of the electronic device. Here, it needs to be noted that, the touch screen of the electronic device can be a capacitive touch screen. In this case, since the first electric conductor, the second electric conductor and the third electric conductor are electric conductors, the capacitance at the position of a contact or a closeness will be influenced when the first electric conductor, the second electric conductor and the third electric conductor contact with or close to the touch screen of the electronic device, and thus the processing unit can determine the contact positions of the first electric conductor, the second electric conductor and the third electric conductor on the touch screen.

Then, the electronic device can determine the structure (shape) of the triangle being composed of the first electric conductor, the second electric conductor and the third electric conductor based on the positions of the contact points of the first electric conductor, the second electric conductor and the third electric conductor on the touch screen. In particular, the sides of the triangle and the included angles between the sides can be obtained according to the positions of the first electric conductor, the second electric conductor and the third electric conductor on the touch screen, such that the shape of the triangle will be obtained.

Then, the processing unit compares the structure of the triangle with the plurality of identifying information stored in the storage unit, and determines the type or model of the specific object based on a comparison result. In particular, identifying information corresponding to the triangle being composed of the first electric conductor, the second electric conductor and the third electric conductor on the to-be-identified object of the specific object can be prestored in the storage of the electronic device. In this case, after the electronic device obtains the shape of the triangle being composed of the first electric conductor, the second electric conductor and the third electric conductor, the electronic device can compare the shape of the triangle with the prestored identifying information, and determine the type and/or model of the object contacting with the touch screen when the match thereof is found.

In addition, in another example, the processing unit can further determine the placing direction of the object based on the orientation of the structure (shape) of the triangle being composed of the first electric conductor, the second electric conductor and the third electric conductor. Here, since the processing unit has identified the shape of the triangle being composed of the three electric conductors on the to-be-identified object, the processing unit can determine the placing direction of the object through identifying the direction of the vertex of the triangle being composed of the third electric conductor, or the orientation of the triangle can be determined through the included angle between the connecting line formed between the first electric conductor and the second electric conductor and a horizontal datum line. Here, it needs to be noted that, it needs to associate the orientation of the shape of the triangle being composed of the first electric conductor, the second electric conductor and the third electric conductor on the to-be-identified object with the orientation of the specific object to which the to-be-identified object is adhered (for example, the pointing direction of one vertex of the triangle is consistent with the horizontal or vertical direction of the specific object), such that the processing unit 22 can determine the placing direction of the specific object through identifying the orientation of the triangle.

Fifth Embodiment

In the fifth embodiment of the present disclosure, further provided is a positioning method based on a touch screen of an electronic device, which can be applied to the above method of identifying the to-be-identified object.

Figure 15A:
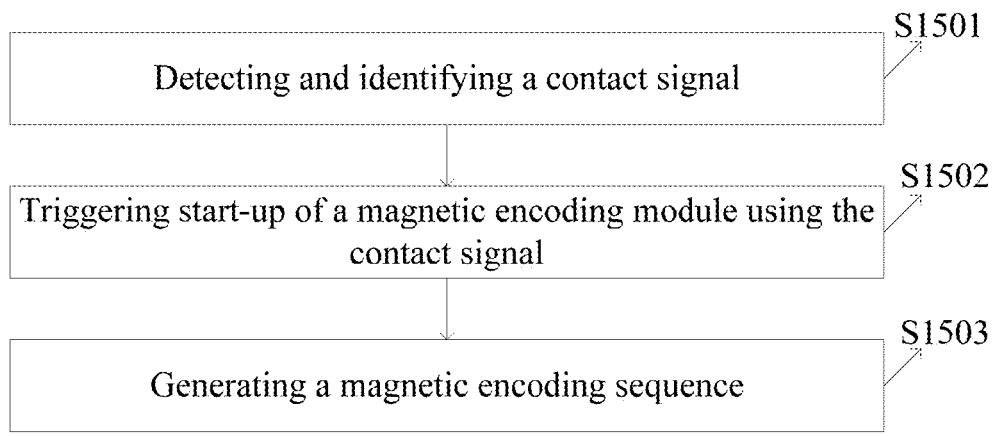
FIG. 15A is a flow chart of a positioning method based on a touch screen of an electronic device disclosed in a fifth embodiment of the present disclosure.

FIG. 15A shows a positioning method based on a touch screen of an electronic device according to the present embodiment, comprising:

S1501: detecting and identifying a contact signal of the to-be-identified object on the touch screen of the electronic device;

The contact signal comprises a touch signal, a set hand signal, a single inching signal or a continuous inching signal of the to-be-identified object on the touch screen of the electronic device as well as any random combination of the above modes.

The implementation of the contact signal can include any random combination of the above modes with respect to the performing of the preset operations.

S1502: triggering start-up of a magnetic encoding module installed in the electronic device in response to the contact signal;

When the electronic device detects and identifies the occurring of the contact signal, the contact signal triggers the start-up of the magnetic encoding module. The electronic device can add an electronic layer for detecting the contact signal to the touch layer, or modify the existing touch layer to generate and/or send magnetic encoding information.

S1503: the magnetic encoding module generating a magnetic encoding sequence for an occurring position of the contact signal.

Figure 15B:
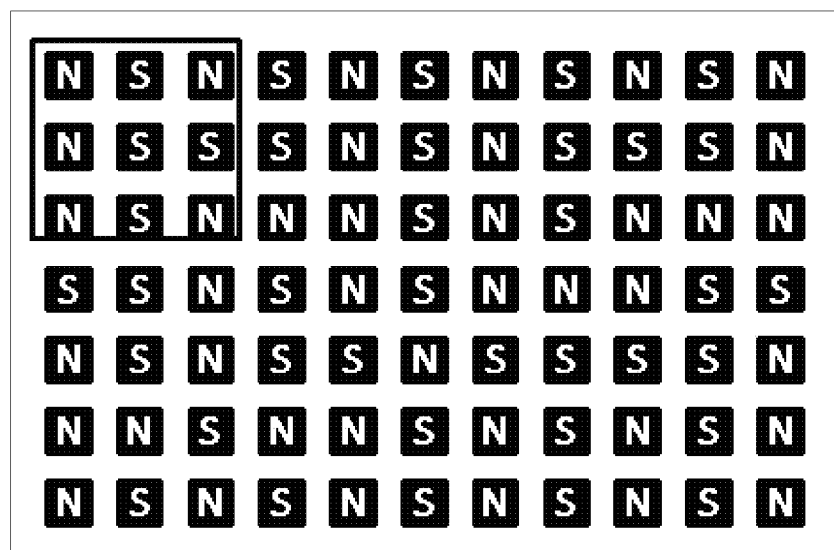
FIG. 15B is an diagram illustrative of a magnetic encoding sequence in a positioning method based on a touch screen of an electronic device disclosed in the fifth embodiment of the present disclosure.

As shown in FIG. 15B, the magnetic encoding sequence can be generated in real time correspondingly to the occurrence of the contact signal, and the occurring position of the contact signal can be interpreted as one point or at a position of hand ending. The presentation form and encoding principle for the magnetic encoding sequence is not limited to the mode as shown in FIG. 15B.

The present implementation mode illustrates the process of generating the magnetic encoding sequence from the viewpoint of the electronic device, and with the aid of a module for reading the magnetic encoding sequence on the to-be-identified object (which produces the contact signal on the electronic device), the present implementation mode can accurately position and do not waste the energy consumption for the to-be-identified object and the touch electronic device turning on a wireless unit to perform a positioning communication.

It needs to be specified that, after the magnetic encoding sequence is analyzed by the electronic device, it can obtain and know the position of the to-be-identified object on the touch screen of the electronic device, i.e., coordinate data.

Figure 16A:
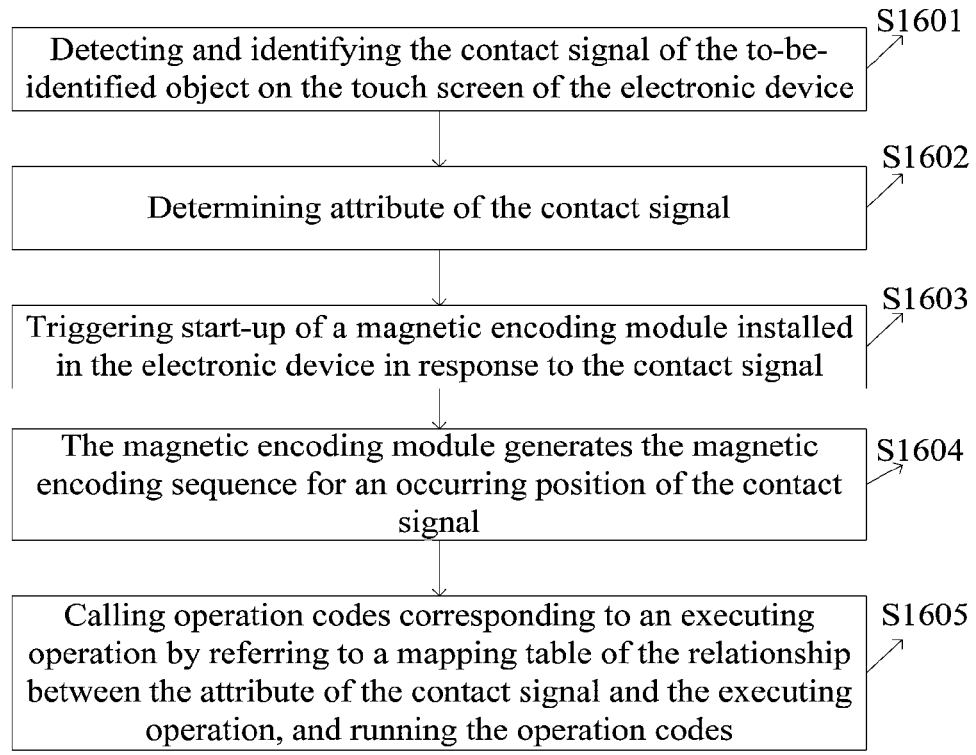
FIG. 16A is a flow chart of a positioning method based on a touch screen of an electronic device disclosed in the fifth embodiment of the present disclosure.

FIG. 16 shows a positioning method based on a contact screen of an electronic device, comprising:

S1601: detecting and identifying the contact signal of the to-be-identified object on the touch screen of the electronic device;

S1602: determining attribute of the contact signal;

The attribute of the contact signal is specified by continuing from FIG. 15, a magnetic encoding sequence can be produced according to a preset position to generate the magnetic encoding sequence. The attribute of the contact signal comprises type, motion path, times of inching or inching track and so on of the contact signal.

S1603: triggering start-up of a magnetic encoding module installed in the electronic device in response to the contact signal;

S1604: the magnetic encoding module generating the magnetic encoding sequence for an occurring position of the contact signal.

What can be taken as an example to be specified is determining a path of a hand signal when the contact signal is the hand signal;

The magnetic encoding module generates the magnetic encoding sequence for an ending position of the path of the hand signal.

S1605: calling operation codes corresponding to an executing operation and executing the operation codes by referring to a mapping table of the relationship between the attribute of the contact signal and the executing operation.

Figure 16B:
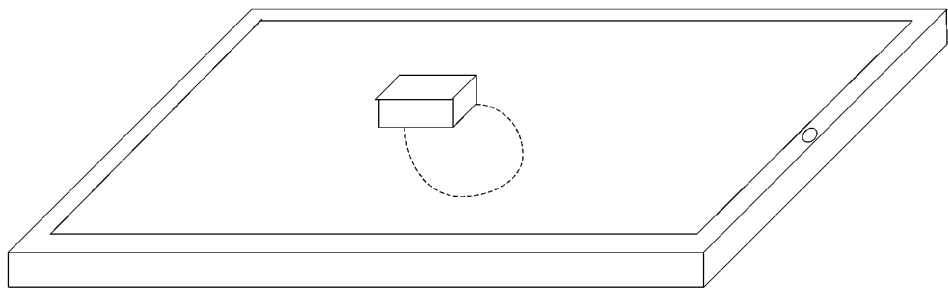
FIG. 16B is an illustrative application diagram of a positioning method based on a touch screen of an electronic device disclosed in the fifth embodiment of the present disclosure.

It can be continued from the example in S1604. As shown in FIG. 16B, after the magnetic encoding sequence is generated, the to-be-identified object obtains a position of the to-be-identified object itself on the touch screen of the electronic device after interpreting the magnetic encoding sequence. The electronic device identifies the path of the hand signal, such as a circled hand signal (the attributes of the contact signal are: hand type and the path being a circle). At the viewpoint of the electronic device, the circled hand signal actually indicates that the to-be-identified object sends a picture request to the electronic device via the contact signal;

The position at which the request occurs is associated with the coordinate data obtained by the to-be-identified object, for example, a picture scope delineated by the hand signal of the to-be-identified objet (data associating with one part of the picture or the whole document folder and so on), or a picture at the position on the touch screen of the electronic device at which the to-be-identified object is placed. The electronic device can sent a picture to the positioned to-be-identified object according to the hand signal and the operating codes for sending a picture.

Figure 17:
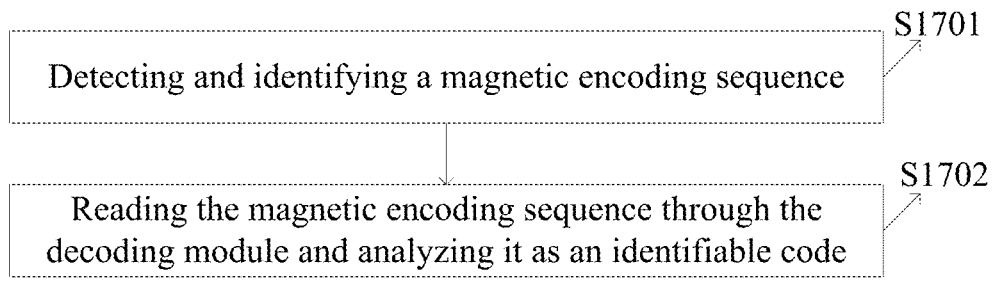
FIG. 17 is a flow chart of a positioning method based on a touch screen of an electronic device disclosed in the fifth embodiment of the present disclosure.

FIG. 17 shows a positioning method based on a touch screen of an electronic device, comprising:

S1701: detecting and identifying a magnetic encoding sequence, and the magnetic encoding sequence being generated by a contact signal of the to-be-identified object on the touch screen of the electronic device triggering start-up of a magnetic encoding module installed in the electronic device;

The actions of detecting and identifying are interpreted as discriminating whether the sensed signal is the magnetic encoding sequence before the magnetic encoding module receives and analyzes the magnetic encoding sequence, and no subsequent processing will be performed on the occasional contact signal without any positioning need.

S1702: reading the magnetic encoding sequence and analyzing it as an identifiable code through the decoding module, the identifiable code corresponding to coordinate data of the to-be-identified object on the touch screen of the electronic device.

The identifiable code can be a binary code matching with the magnetic encoding sequence. The binary code is a sequence identifiable for a controller in the to-be-identified object at a receiving end. The binary code can only correspond to one coordinate, so as to achieve the positioning of the to-be-identified object.

Figure 18A:
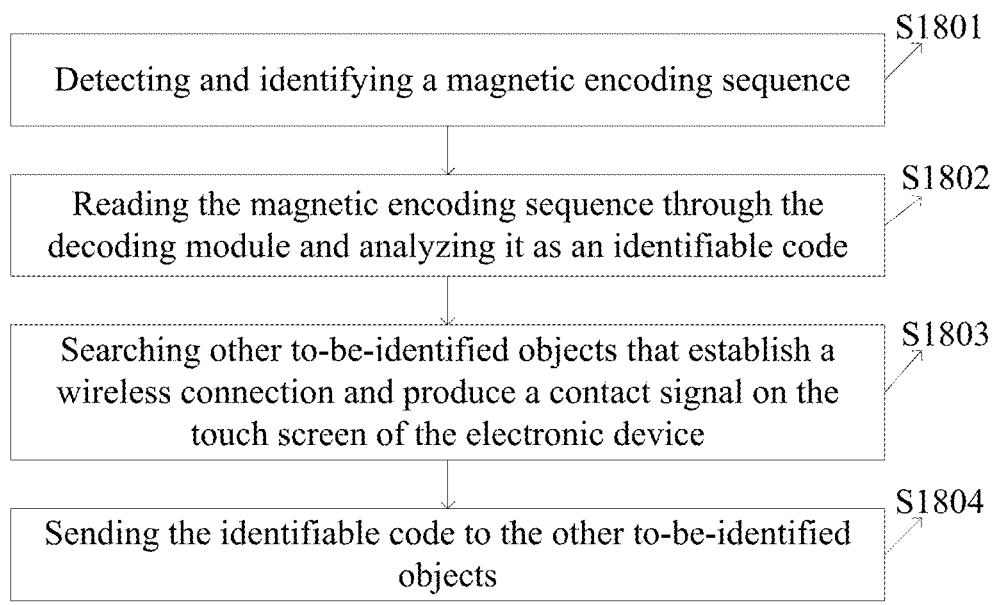
FIG. 18A is a flow chart of a positioning method based on a touch screen of an electronic device disclosed in the fifth embodiment of the present disclosure.

FIG. 18A shows another positioning method based on a touch screen of an electronic device, comprising:

S1801: detecting and identifying a magnetic encoding sequence, and the magnetic encoding sequence being generated by a contact signal of the to-be-identified object on the touch screen of the electronic device triggering start-up of a magnetic encoding module installed in the electronic device;

It needs to be specified that, there may be a plurality of the magnetic encoding sequences detected and identified, that is, there may be a plurality of to-be-identified objects for producing the contact signal on the touch screen of the electronic.

S1802: reading the magnetic encoding sequence and analyzing it as an identifiable code through the decoding module, the identifiable code corresponding to coordinate data of the to-be-identified object on the touch screen of the electronic device.

Figure 18B:
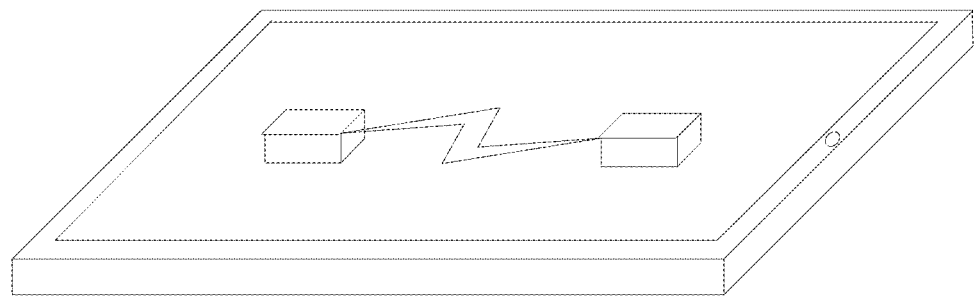
FIG. 18B is an illustrative application diagram of a positioning method based on a touch screen of an electronic device disclosed in the fifth embodiment of the present disclosure.

S1803: searching other to-be-identified objects that establish a wireless connection with the to-be-identified object and produce contact signal on the touch screen of the electronic device;

As shown in FIG. 18B, when there may be a plurality of to-be-identified objects producing the contact signal on the touch screen of the electronic, the to-be-identified objects therebetween can interact with the identifiable code by means of wireless communication to inform each other of the coordinate on the touch screen of the electronic device.

S1804: sending the identifiable code to the other to-be-identified objects.

It needs to be specified that, the module for sending the identifiable code may be a remote communication module such as GPRS, 3G module, or may be a short-range communication module such as a Bluetooth module, a infrared module and so on.

Figure 19A:
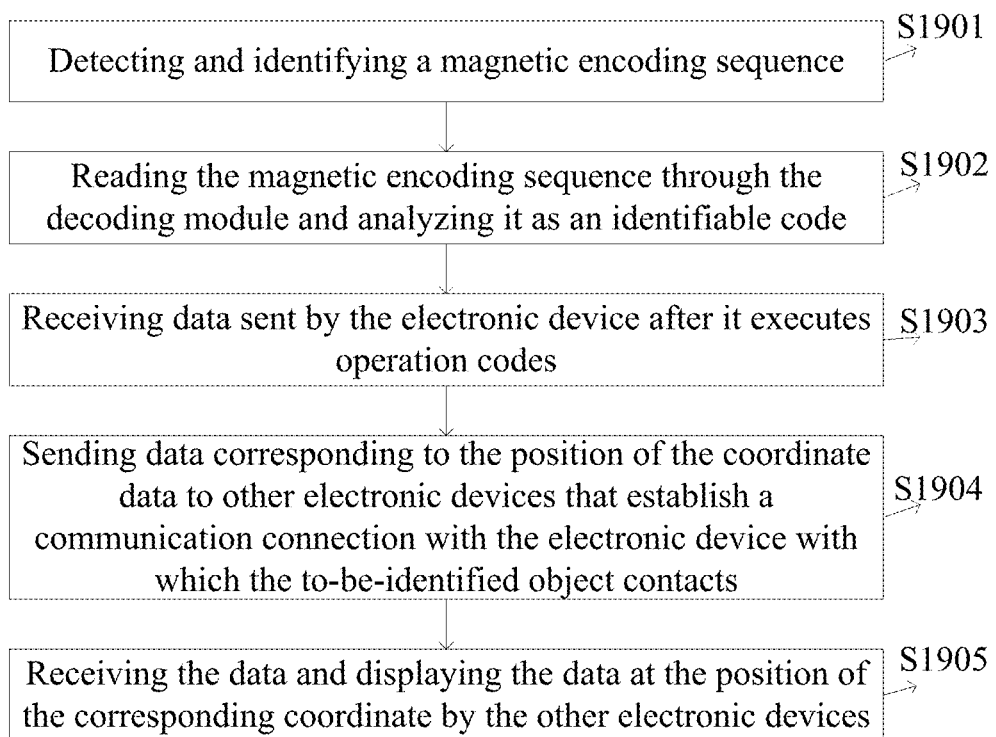
FIG. 19A is a flow chart of a positioning method based on a touch screen of an electronic device disclosed in the fifth embodiment of the present disclosure.

FIG. 19A shows another positioning method based on a touch screen of an electronic device, comprising:

S1901: detecting and identifying a magnetic encoding sequence, and the magnetic encoding sequence being generated by a contact signal of the to-be-identified object on the touch screen of the electronic device triggering start-up of a magnetic encoding module installed in the electronic device;

S1902: reading the magnetic encoding sequence and analyzing it as an identifiable code through the decoding module, the identifiable code corresponding to coordinate data of the to-be-identified object on the touch screen of the electronic device;

S1903: receiving data sent by the electronic device after it executes operation codes;

The data sent by the electronic device after it executes operating codes is obtained through:

The electronic device determining a type of the contact signal, calling the operation codes corresponding to the executing operation according to a mapping table of the relationship between the type of the contact signal and the executing operation, and executing the operation codes.

S1904: sending data corresponding to the position of the coordinate data to other electronic devices that establish a communication connection with the electronic device at which the to-be-identified object is placed.

Figure 19B:
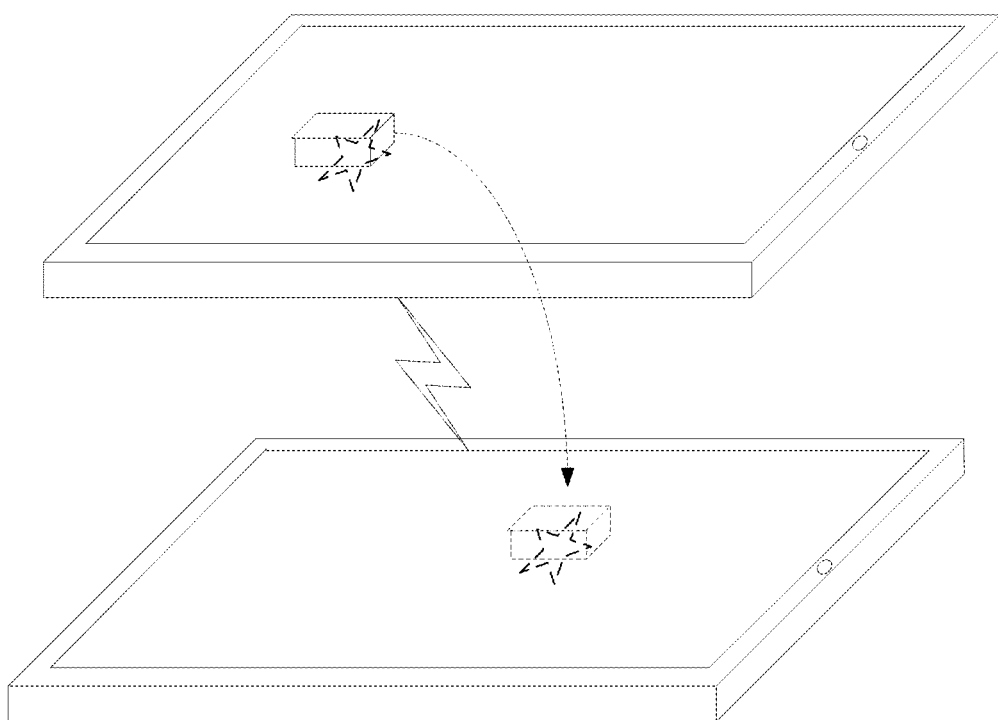
FIG. 19B is an illustrative application diagram of a positioning method based on a touch screen of an electronic device disclosed in the fifth embodiment of the present disclosure.

As shown in FIG. 19B, if the to-be-identified object such as a mobile phone is placed on the touch screen of the first electronic device, and the first electronic device possesses a communication connection relationship with a second electronic device (including a touch screen), the communication connection relationship may be a wired data connection, or may be a wireless data connection.

When the magnetic encoding sequence is generated on the first electronic device, it can be obtained and known the position of the to-be-identified object on the touch screen of the first electronic device, and when the contact signal is a hand signal, data corresponding to a picture or a icon on the current screen covered by the position or indicated by a motion track of the hand signal is sent to the second electronic device. The second electronic device can display the received picture or graph data on the screen.

S1905: receiving the data and displaying the data at the position of the corresponding coordinate by the other electronic devices.

Figure 19C:
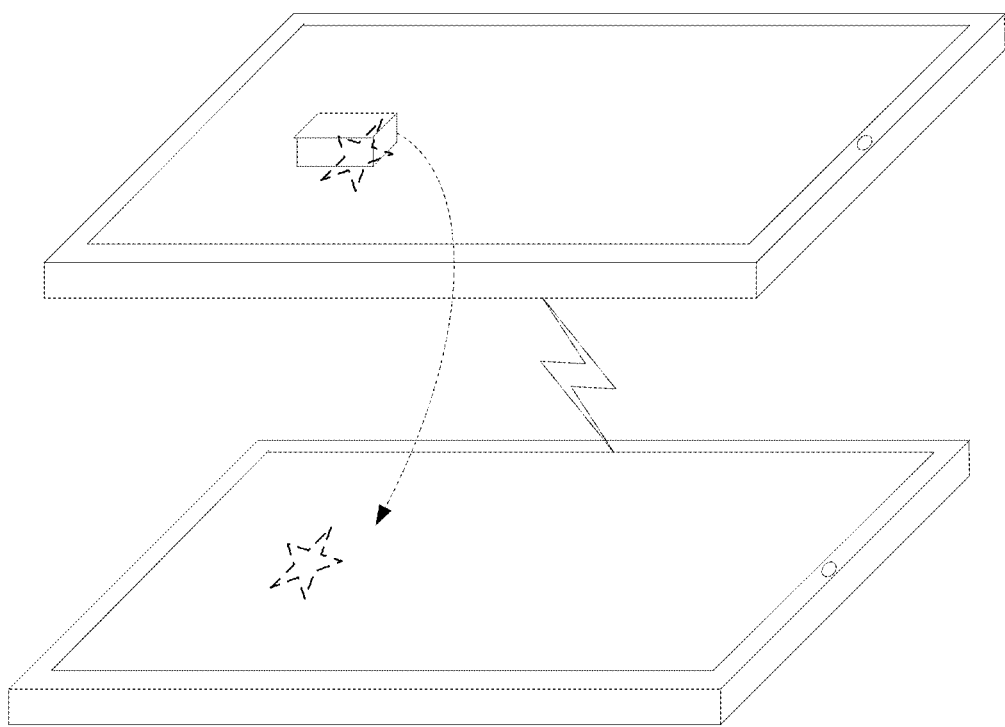
FIG. 19C is an illustrative application diagram of a positioning method based on a touch electronic device disclosed in the fifth embodiment of the present disclosure.

The position of the corresponding coordinate is interpreted as, as shown in FIG. 19C, while the first electronic device sends data corresponding to a picture or a icon, it also sends position information of the to-be-identified on the first electronic device, and then the second electronic device can display the received data at a position of the screen that matches with the position information; or it is interpreted as, the to-be-identified object also produces a contact signal on the second electronic device, and as shown in FIG. 19B, the second electronic device obtains and knows a position of the to-be-identified object on the screen through the magnetic encoding sequence, and then the second electronic device can display the received data at the position of the to-be-identified object on the screen.

Figure 20:
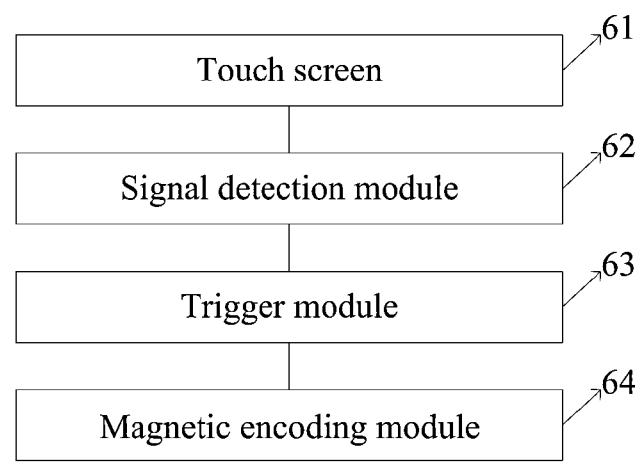
FIG. 20 is an illustrative diagram of structure of an electronic device disclosed in the fifth embodiment of the present disclosure.

FIG. 20 shows an electronic device, comprising:

A touch screen 61 being capable of sensing a human body touch or motion signal or electronic pen touch or motion signal as well as a contact sensing when a wireless communication electronic device is placed;

A signal detection module 62 for detecting and identifying the contact signal of the to-be-identified object on the touch screen of the electronic device; the signal detection module can discriminate whether the contact signal is a contact signal with a positioning need, and if a contact area or a contact pressure of one contact signal does not reach a preset value, the contact signal will be omitted and no subsequent processing is performed. The detection module can be implemented by a sensor;

A trigger module 63 for triggering the start-up the magnetic encoding module installed in the electronic device in response to the contact signal; when it is determined that there is a contact signal, the trigger module triggers the start-up of the magnetic encoding module to perform a positioning encoding in response to the contact signal, wherein the trigger module may be an electronic switch or a micro switch, so as to control the start-up of the magnetic encoding module;

The magnetic encoding module 64 for generating the magnetic encoding sequence for the occurring position of the contact signal.

The magnetic encoding module can set a pole through a unit configuration that matches with an electrode of the touch screen, so as to make it convenient for determining the magnetic encoding sequence.

The touch screen 61 can correspond to the contact display screen in the previous embodiment, and the signal detection module 62, the trigger module 63 and the magnetic encoding module 64 can be used for composing the acquiring unit in the previous embodiment.

Figure 21:
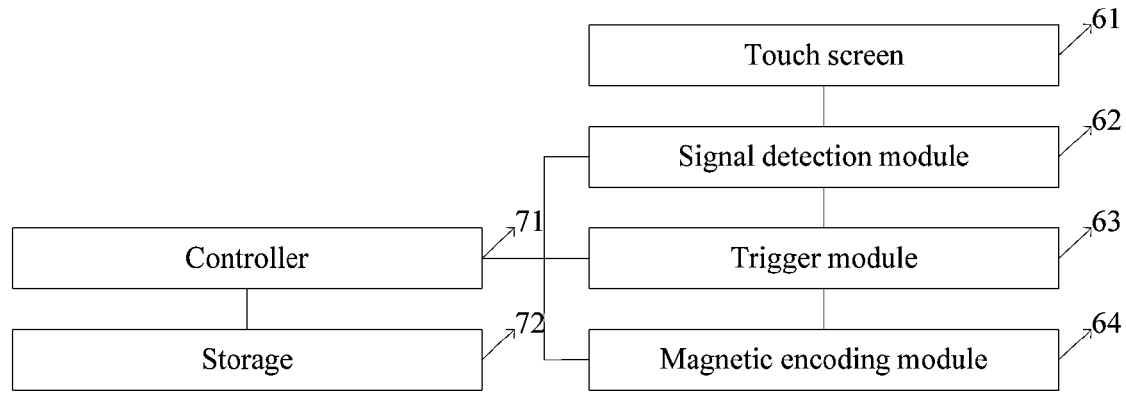
FIG. 21 is an illustrative diagram of structure of an electronic device disclosed in the fifth embodiment of the present disclosure.

FIG. 21 shows another electronic device, characterized in that, comprising:

On the basis of diagram of FIG. 20 and the description corresponding thereto, the electronic device further comprises a controller 71 for determining attribute of a contact signal and calling operation codes corresponding to an executing operation by referring to a mapping table of the relationship between the attribute of the contact signal and the executing operation, and executing the operation codes.

In addition, the controller 71 determines a path of a hand signal when the contact signal is the hand signal, and controls the magnetic encoding module to generate the magnetic encoding sequence for an ending position of the path of the hand signal. The controller 71 can be implemented by the operating unit in the previous embodiment.

A storage 72 for storing the mapping table and the operation codes of the executing operation.

The significance of the present embodiment lies in that the controller may be implemented by a separately set chip or may be integrated into CPU in the electronic device. Here, the operating unit can be taken as a generic term of the two.

Figure 22:
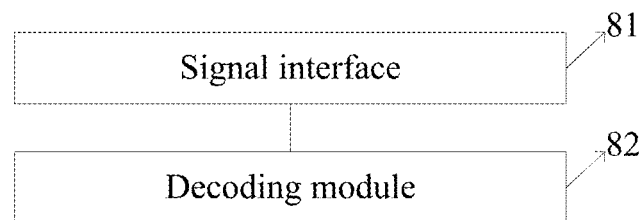
FIG. 22 is an illustrative diagram of structure of an electronic device disclosed in the fifth embodiment of the present disclosure.

FIG. 22 shows a to-be-identified object, comprising: a signal interface 81 for detecting and identifying a magnetic encoding sequence generated by a contact signal of the to-be-identified object on the touch screen of the electronic device triggering start-up of a magnetic encoding module installed in the electronic device; a decoding module 82 for reading the magnetic encoding sequence and analyzing it as an identifiable code, the identifiable code corresponding to coordinate data of the to-be-identified object on the touch screen of the electronic device.

The to-identified object is interpreted as any random object with the signal interface and the decoding module, may be a chess piece on an electronic chessboard, or may be a smart device such as a mobile phone and so on.

The decoding module actually needs to perform the decoding operation under the control of a micro controller, that is, the magnetic encoding sequence may be read by the to-be-identified object to make the to-be-identified object itself obtain its position, or may be read by other electronic devices to make the other to-be-identified objects analyze the magnetic encoding sequence to obtain the position of the to-be-identified object on the screen.

Figure 23:
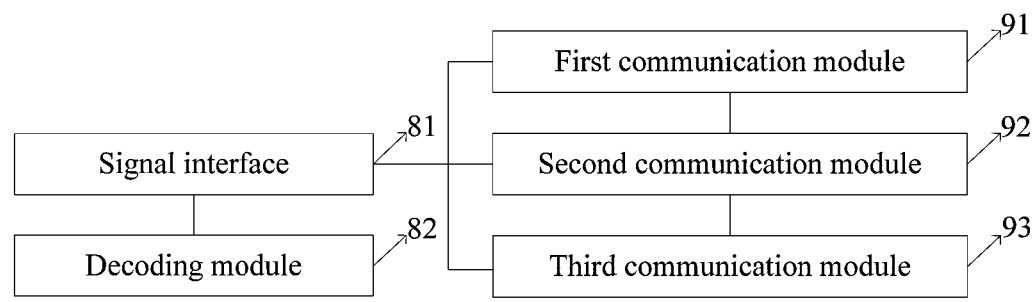
FIG. 23 is an illustrative diagram of structure of an electronic device disclosed in the fifth embodiment of the present disclosure.

FIG. 23 shows another to-be-identified object. Besides the signal interface 81 and the decoding module 82 as shown in FIG. 22, it further comprises: a first communication module 91 for searching other to-be-identified objects that establish a wireless connection with the to-be-identified object and produce the contact signal on the touch screen of the electronic device, and sending the identifiable code to the other to-be-identified objects; a second communication module 92 for receiving data sent by the electronic device after it executes operation codes. The data sent by the electronic device after it executes operating codes is obtained through: the electronic device determining a type of the contact signal, calling the operation codes corresponding to the executing operation according to the mapping table of the relationship between the type of the contact signal and the executing operation, and executing the operation codes; and a third communication module 93 for sending the coordinate data to other touch electronic devices that establish a communication connection with the electronic device with which the to-be-identified object contacts.

The first communication device, the second communication device and the third communication device can be integrated into one communication device and can receive signal and data of communication with the aid of the signal interface.

Figure 24:
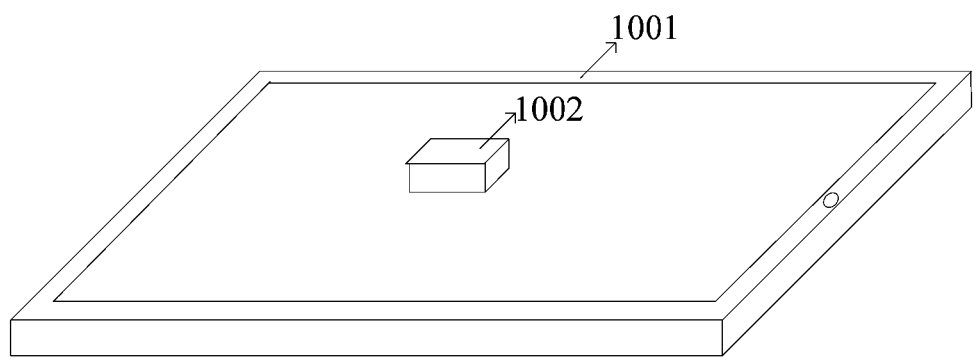
FIG. 24 is an illustrative diagram of structure of a positioning system based on a touch electronic device disclosed in the fifth embodiment of the present disclosure.

FIG. 24 shows a positioning system based on a electronic device, comprising: a first electronic device 1001 and a second electronic device 1002, wherein:

The first electronic device comprises: a touch screen; a signal detection module for detecting and identifying a contact signal of the second electronic device on the touch display screen of the first electronic device; a trigger module for triggering start-up of a magnetic encoding module installed in the first electronic device in response to the contact signal; and a magnetic encoding module for generating a magnetic encoding sequence for an occurring position of the contact signal.

The second electronic device comprises: a signal interface for detecting and identifying a magnetic encoding sequence generated by a contact signal of the second electronic device on the touch screen of the first electronic device triggering start-up of a magnetic encoding module installed in the first electronic device; a decoding module for reading the magnetic encoding sequence and analyzing it as an identifiable code, the identifiable code corresponding to coordinate data of the second electronic device on the touch screen of the first electronic device.

The first electronic device can be represented as the above electronic device, and the second electronic device can be represented as the above to-be-identified object.

It needs to be specified that, in the system, the number of the first electronic device and the second electronic device are not limited. Data transmission can be performed between the first electronic devices by means of electric connection and/or wireless connection, when the second electronic device is positioned; also, data transmission can be performed between the second electronic devices by means of electric connection and/or wireless connection, when the second electronic devices are positioned It needs to specify that, given that the system is specified based on the method and device, the function and structure of the first electronic device and the second electronic device can refer to the previous description of the present specification, detailed omitted.

The positioning method, the electronic device and the system based on the touch screen of the electronic device in the present embodiment generates the magnetic encoding sequence by the electronic device when the to-be-identified object contacts with the touch screen of the electronic device, identifies and analyzes the magnetic encoding sequence by the to-be-identified object and determines the position of the to-be-identified object on the touch screen of the electronic device by using the corresponding coordinate data obtained after the analysis to the magnetic encoding sequence, so as to make the to-be-identified object obtain the coordinate data on the touch screen of the electronic device through a magnetic sensing mode, which overcomes the technical problem of high energy consumption of positioning communication in the existing method of performing a positioning communication on the to-be-identified object placed on the touch screen of the electronic device by adopting a wireless mode.

The features in the present embodiments of the present disclosure can be appropriately combined. To sum up, in the electronic device provided in the present disclosure, the acquiring unit of the electronic unit acquires status information within a predetermined distance from the electronic device, the generating unit generates the operation instruction according to the status information of the to-be-identified object, such that the operating unit of the electronic device is able to perform corresponding operations. Compared with the prior art, the electronic device provided in the embodiments of the present disclosure is capable of enabling users to complete the executing of the applications of the electronic device by operating the to-be-identified object, thus improving experience and enjoyment of users.

Based on the descriptions of the above embodiments, it is clear for those skilled in the art to know that the present disclosure can be implemented with the aid of software as well as necessary general hardware. Of course, it can be implemented by hardware, but the former is preferred to be an implementation mode in many cases. Based on such understanding, the technical solution of the present disclosure can be reflected in a form of software products in substance or for the part making contribution to the prior art. The computer software products are stored in a readable storage medium, such as floppy disk, hard disk and compact disk of a computer, comprising several instructions used for making a computer device (it may be a personal computer, a server or a network device and so on) perform the method as described in the embodiments of the present disclosure.

The above are described in details the present embodiment of the present disclosure, however, the scope sought for protection in the present disclosure is not limited thereto. Any modification or replacement within the technical scope disclosed in the present disclosure easily conceived by those skilled in the art should be considered as falling into the protection scope of the present disclosure. Therefore, the scope sought for protection in the present disclosure should be subject to the scope sought for protection in the claims.

What is claimed:

1. A method of identifying a to-be-identified object applied to an electronic device, the to-be-identified object being independent of the electronic device and placed within a predetermined distance from the electronic device, the method comprising:
   the electronic device acquiring status information of the to-be-identified object through identifying the to-be-identified object, the status information being spatial orientation information of the to-be-identified object relative to the electronic device;
   the electronic device generating an operation instruction according to the status information of the to-be-identified object; and
   the electronic device operating according to the operation instruction,
   wherein the electronic device comprises a first identifying means and a second identifying means with the second identifying means differing from the first identifying means, the identifying the to-be-identified object comprising:
   determining the first identifying information of the to-be-identified object through the first identifying means;
   determining an identifying range of the to-be-identified object according to the first identifying information;
   determining the second identifying information of the to-be-identified object through the second identifying means; and
   determining the to-be-identified object within the identifying range of the to-be-identified object according to the second identifying information.

2. The method as claimed in claim 1, wherein the electronic device comprises a display screen, the to-be-identified object is placed within a coverage area of the display screen of the electronic device; or is placed within a space being composed of extended distances extending from each of sides of the electronic device.

3. The method as claimed in claim 2, wherein the display screen is a touch display screen, when the to-be-identified object is placed within a coverage area of the touch display screen of the electronic device, the electronic device acquiring status information of the to-be-identified object comprises:
   detecting and identifying a contact signal of the to-be-identified object on the touch display screen; and
   generating a magnetic encoding sequence for an occurring position of the contact signal in response to the contact signal.

4. The method as claimed in claim 3, wherein the electronic device generating an operation instruction according to the status information of the to-be-identified object comprises:
   determining an attribute of the contact signal, the attribute of the contact signal representing a rotation posture of the to-be-identified object;
   calling operation codes corresponding to an executing operation by referring to a mapping table of the relationship between the attribute of the contact signal and the executing operation, and executing the operation codes.

5. The method as claimed in claim 3, further comprising:
   determining a path of a hand signal when the contact signal is the hand signal;
   generating a magnetic encoding sequence for an occurring position of the contact signal that includes generating the magnetic encoding sequence for an ending position of the path of the hand signal.

6. The method as claimed in claim 1, wherein the operation instruction is an instruction for controlling the electronic device to perform a corresponding action, the corresponding action is changing output content or calling a program.

7. The method as claimed in claim 1, wherein the display screen comprises: an electric field layer for forming an electric field, and the electric field changes when the to-be-identified object is placed in the electric field; wherein at least one conductor is set in the to-be-identified object; and the electronic device identifying the to-be-identified object through the following operations:
  detecting a conductor distribution in the to-be-identified object according to changing information of the electric field and determining encoding information of the to-be-identified object according to the conductor distribution; and
  identifying the to-be-identified object according to the encoding information of the to-be-identified object and prestored encoding information in the electronic device.

8. The method as claimed in claim 7, further comprising analyzing the spatial orientation of the to-be-identified object according to change of the encoding information of the to-be-identified object.

9. The method as claimed in claim 7, wherein the conductor distribution of the at least one conductor in the to-be-identified object is a two-dimensional distribution or a three-dimensional distribution.

10. An electronic device, comprising:
  a first identifying means for determining a first identifying information of a to-be-identified object being independent of the electronic device and placed within a predetermined distance from the electronic device;
  a second identifying means different from the first identifying means for determining a second identifying information of the to-be-identified object;
  an acquiring unit for acquiring status information of a to-be-identified object by identifying the to-be-identified object, the status information being spatial orientation information of the to-be-identified object relative to the electronic device;
  a generating unit for generating an operation instruction according to the status information of the to-be-identified object; and
  an operating unit for operating according to the operation instruction,
  wherein the identifying the to-be-identified object comprises:
  determining an identifying range of the to-be-identified object according to the first identifying information; and
  determining the to-be-identified object within an identifying range of the to-be-identified object according to the second identifying information.

11. The electronic device as claimed in claim 10, further comprising a display screen, wherein the to-be-identified object is placed within a coverage area of the display screen of the electronic device; or is placed within a space being composed of extended distances extending from each of sides of the electronic device.

12. The electronic device as claimed in claim 11, wherein the display screen is a touch display screen, when the to-be-identified object is placed within a coverage area of the touch display screen of the electronic device, the acquiring unit comprises:
  a signal detection module for detecting and identifying a contact signal of the to-be-identified object on the touch display screen;
  a trigger module for triggering start-up of a magnetic encoding module installed in the electronic device in response to the contact signal; and
  the magnetic encoding module for generating a magnetic encoding sequence for an occurring position of the contact signal.

13. The electronic device as claimed in claim 12, wherein the operating unit further determines a path of a hand signal when the contact signal is the hand signal; and the magnetic encoding module generates a magnetic encoding sequence for an ending position of the path of the hand signal.

14. The electronic device as claimed in claim 10, wherein the operation instruction is an instruction for controlling the electronic device to perform a corresponding action, the corresponding action is changing output content or calling a program.

15. The electronic device as claimed in claim 10, wherein the display screen comprises: an electric field layer for forming an electric field, and the electric field changes when the to-be-identified object is placed in the electric field; wherein at least one conductor is set in the to-be-identified object; and the identifying sub-unit further comprises:
  a detecting unit for detecting a conductor distribution in the to-be-identified object according to changing information of the electric field and determining encoding information of the to-be-identified object according to the conductor distribution; and
  a processing unit for identifying the to-be-identified object according to the encoding information of the to-be-identified object and prestored encoding information in the electronic device.

16. The electronic device as claimed in claim 15, wherein the processing unit further analyzes the spatial orientation of the to-be-identified object according to change of the encoding information of the to-be-identified object.

17. The electronic device as claimed in claim 15, wherein the conductor distribution of the at least one conductor in the to-be-identified object is a two-dimensional distribution or a three-dimensional distribution.

18. The electronic device as claimed in claim 10, wherein the electronic device further comprising:
  a storage for storing a mapping table of the relationship between attribute of the contact signal and an executing operation as well as associated operation codes corresponding to the executing operation;
  wherein the operating unit determines attribute of the contact signal, calls operation codes corresponding to the executing operation by referring to the mapping table and executes the operation codes, the attribute of the contact signal representing a rotation posture of the to-be-identified object.

* * * * *